(12) United States Patent
Fernando et al.

(10) Patent No.: US 11,784,674 B2
(45) Date of Patent: Oct. 10, 2023

(54) CALIBRATION OF OPEN SPACE FOR AN ANTENNA ARRAY MODULE

(71) Applicant: QUALCOMM Incorporated, San Diego, CA (US)

(72) Inventors: Udara Fernando, San Diego, CA (US); Brian Clarke Banister, San Diego, CA (US); Eyosias Yoseph Imana, Chula Vista, CA (US)

(73) Assignee: QUALCOMM Incorporated, San Diego, CA (US)

( * ) Notice: Subject to any disclaimer, the term of this patent is extended or adjusted under 35 U.S.C. 154(b) by 176 days.

(21) Appl. No.: 17/210,228

(22) Filed: Mar. 23, 2021

(65) Prior Publication Data

US 2021/0306022 A1    Sep. 30, 2021

Related U.S. Application Data

(60) Provisional application No. 62/994,257, filed on Mar. 24, 2020.

(51) Int. Cl.
*H04B 1/3827* (2015.01)
*H01Q 21/00* (2006.01)

(52) U.S. Cl.
CPC ........... *H04B 1/3833* (2013.01); *H01Q 21/00* (2013.01)

(58) Field of Classification Search
CPC .... H04B 1/3833; H04B 17/318; H04B 17/12; H04B 1/3838; H01Q 21/00; H01Q 1/243; H01Q 3/267; H01Q 21/28
See application file for complete search history.

(56) References Cited

U.S. PATENT DOCUMENTS

| | | | | |
|---|---|---|---|---|
| 9,730,049 | B1* | 8/2017 | Malik | H04W 8/005 |
| 10,109,915 | B2* | 10/2018 | Frink | H04B 17/12 |
| 10,169,559 | B2* | 1/2019 | Kim | G06F 1/163 |
| 10,951,331 | B1* | 3/2021 | Chisu | H04B 17/318 |
| 2006/0227040 | A1* | 10/2006 | Christian | G01S 7/4056 |
| | | | | 342/149 |

(Continued)

OTHER PUBLICATIONS

International Search Report and Written Opinion—PCT/US2021/023982—ISA/EPO—dated Jun. 14, 2021.

*Primary Examiner* — Jinsong Hu
*Assistant Examiner* — Rui M Hu
(74) *Attorney, Agent, or Firm* — QUALCOMM Incorporated

(57) ABSTRACT

Aspects relate to a calibration of an antenna array module of a wireless communication device in open space. The antenna array module may be used as a proximity sensor to detect an object's proximity relative to the antenna array module. Aspects include displaying an open space calibration instruction on a display of the wireless communication device, transmitting a proximity test signal from the antenna array module, measuring a value of a first signal received at the antenna array module in response to transmitting the proximity test signal, and storing the value of the first signal as an open space calibration value of the antenna array module. The first signal may be measured at cross-polarized antennas of the antenna array module. The value of the first signal may be representative of perturbations of the proximity test signal at the cross-polarized antennas.

26 Claims, 9 Drawing Sheets

(56) References Cited

U.S. PATENT DOCUMENTS

| | | | |
|---|---|---|---|
| 2008/0122686 A1* | 5/2008 | Wirola | G01S 19/43 342/357.31 |
| 2008/0132283 A1* | 6/2008 | Ponce De Leon | H04B 1/3838 455/566 |
| 2009/0072957 A1* | 3/2009 | Wu | G01S 13/584 340/435 |
| 2010/0164479 A1* | 7/2010 | Alameh | G06F 1/1626 324/115 |
| 2010/0279751 A1* | 11/2010 | Pourseyed | H01Q 3/26 455/575.7 |
| 2011/0207415 A1* | 8/2011 | Luo | H04B 7/0413 455/68 |
| 2012/0001810 A1* | 1/2012 | Soualle | G01S 19/02 343/703 |
| 2012/0208458 A1* | 8/2012 | Iwasaki | H04M 1/72412 455/41.1 |
| 2013/0331044 A1* | 12/2013 | Hu | H01Q 3/24 455/79 |
| 2015/0009063 A1* | 1/2015 | Korsbo | G01F 25/20 342/124 |
| 2015/0333788 A1* | 11/2015 | Ding | H01Q 3/24 455/575.5 |
| 2016/0054440 A1* | 2/2016 | Younis | G01S 13/426 342/55 |
| 2016/0365886 A1* | 12/2016 | Prendergast | H04W 52/18 |
| 2017/0269790 A1* | 9/2017 | Grandi | G06F 3/014 |
| 2017/0273034 A1* | 9/2017 | Colombi | H04B 1/38 |
| 2018/0182389 A1* | 6/2018 | Devaraj | H04L 51/224 |
| 2018/0287651 A1* | 10/2018 | Fernando | H04B 7/0695 |
| 2018/0302138 A1* | 10/2018 | Shirakata | G01S 3/02 |
| 2018/0358991 A1* | 12/2018 | Kwok | H01Q 1/1257 |
| 2019/0025403 A1* | 1/2019 | Hoffman | G01S 7/4021 |
| 2019/0044561 A1* | 2/2019 | Fernando | H01Q 21/29 |
| 2019/0154839 A1* | 5/2019 | Ashjaee | G01S 19/42 |
| 2019/0267709 A1* | 8/2019 | Mow | H01Q 21/24 |
| 2019/0317177 A1* | 10/2019 | Ertan | G01S 13/75 |
| 2019/0353750 A1* | 11/2019 | Rimini | H01Q 21/28 |
| 2019/0356312 A1* | 11/2019 | Greer, Jr. | H03K 17/955 |
| 2020/0044612 A1* | 2/2020 | Bologna | H04B 1/3838 |
| 2020/0161740 A1* | 5/2020 | Islam | H04M 1/72454 |
| 2020/0227824 A1* | 7/2020 | Abdalla | H01Q 3/267 |
| 2020/0274627 A1* | 8/2020 | Motoi | H04B 17/29 |
| 2020/0280128 A1* | 9/2020 | Rafique | H01Q 3/267 |
| 2020/0319327 A1* | 10/2020 | Tsvelykh | G05D 1/0022 |
| 2020/0373681 A1* | 11/2020 | Rojanski | G01S 7/025 |
| 2021/0063534 A1* | 3/2021 | Shams | G01S 7/4052 |
| 2021/0132209 A1* | 5/2021 | Shtrom | G01S 13/347 |
| 2022/0038192 A1* | 2/2022 | Goto | H04B 17/29 |
| 2022/0099827 A1* | 3/2022 | Li | G01S 7/292 |
| 2022/0244846 A1* | 8/2022 | Zhao | G06F 3/04886 |

\* cited by examiner

CALIBRATION OF OPEN SPACE FOR AN ANTENNA ARRAY MODULE

CROSS-REFERENCE TO RELATED APPLICATIONS

This application for patent claims priority to and the benefit of provisional patent application No. 62/994,257 entitled "Calibration of Open Space for An Antenna array module" filed in the United States Patent and Trademark Office on Mar. 24, 2020, the entire content of which is incorporated herein by reference as if fully set forth below in its entirety and for all applicable purposes.

TECHNICAL FIELD

The technology discussed below generally relates to wireless communication devices in wireless communication networks, and more particularly, to the calibration of open space for antenna array modules in wireless communication devices.

INTRODUCTION

Fifth-generation wireless technology, or 5G, may employ millimeter wave (mmWave) frequency transmissions. Millimeter-waves (mmWaves) are absorbed within the first one to two millimeters of human skin, and thermal heating effects may occur when the power density of the waves is above 5-10 milliwatts per centimeter squared (mW/cm$^2$). Therefore, for mmWave frequencies, the Federal Communications Commission (FCC) has adopted a maximum permissible exposure (MPE) restriction limiting the power density of a transmitting antenna. Antenna array modules of wireless communication devices may be configured as sensors that help with MPE compliance. Calibration of the antenna array modules in open space (also referred to as open space calibration) may be performed when utilizing the antenna array modules as sensors.

BRIEF SUMMARY OF SOME EXAMPLES

The following presents a summary of one or more aspects of the present disclosure in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

According to one aspect, a method of open space calibration of an antenna array module of a wireless communication device in a wireless communication network is disclosed. The method includes displaying, on a display of the wireless communication device, an open space calibration instruction prompting a user to hold the wireless communication device during the open space calibration, transmitting a proximity test signal from the antenna array module, measuring a value of a first signal received at the antenna array module in response to transmitting the proximity test signal, and storing the value of the first signal as an open space calibration value of the antenna array module.

According to one aspect, a wireless communication device for wireless communication in a wireless communication network is disclosed. The wireless communication device includes an antenna array module, a wireless transceiver communicatively coupled to the antenna array module, a memory, and a processor communicatively coupled to the antenna array module, the wireless transceiver, and the memory. In one example, the processor is configured to display, on a display of the wireless communication device, an open space calibration instruction prompting a user to hold the wireless communication device during the open space calibration, transmit a proximity test signal from the antenna array module, measure a value of a first signal received at the antenna array module in response to transmitting the proximity test signal, and store the value of the first signal as an open space calibration value of the antenna array module.

These and other aspects will become more fully understood upon a review of the detailed description, which follows. Other aspects and features will become apparent to those of ordinary skill in the art upon reviewing the following description of specific examples in conjunction with the accompanying figures. While features may be discussed relative to certain examples and figures below, all examples can include one or more of the advantageous features discussed herein. In other words, while one or more examples may be discussed as having certain advantageous features, one or more of such features may also be used in accordance with the various examples discussed herein. In a similar fashion, while examples may be discussed below as device, system, or method examples, it should be understood that such examples can be implemented in various devices, systems, and methods.

DETAILED DESCRIPTION

Figure 1:
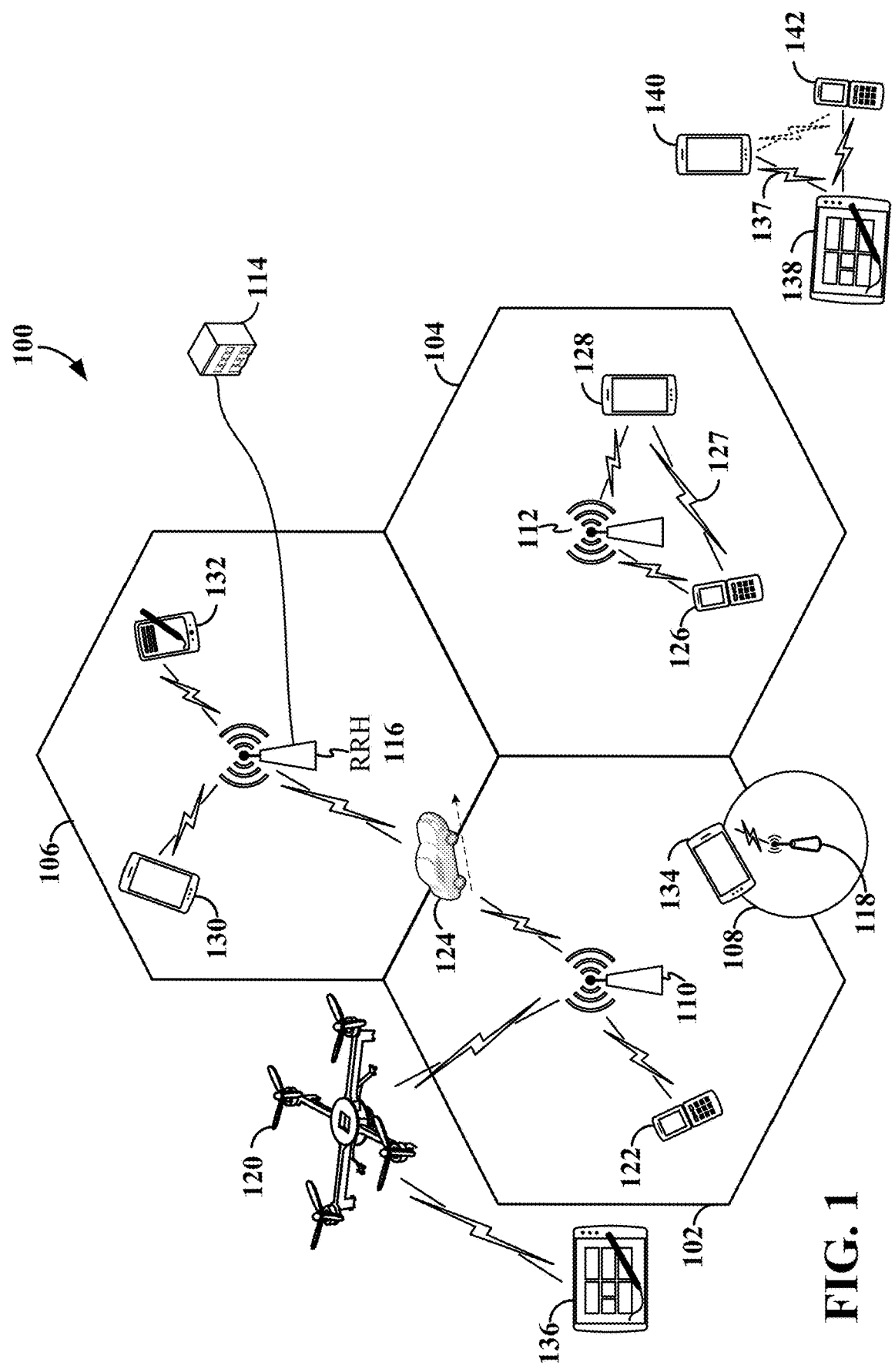
FIG. 1 is a diagram illustrating an example of a wireless radio access network according to some aspects described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, artificial intelligence (AI) enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregated, distributed, or original equipment manufacturer (OEM) devices or systems incorporating one or more aspects of the described innovations. In some practical settings, devices incorporating described aspects and features may also necessarily include additional components and features for the implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc., of varying sizes, shapes, and constitution.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band. Millimeter wave (mmWave) transmissions present potential safety hazards as they can cause localized heating on the skin or a surface of an eye. To protect the public from this hazard, government regulators have set a limit on the maximum permissible mmWave power level per square centimeter area. This limit is called maximum permissible exposure (MPE). The Federal Communications Commission (FCC) in the United States has set the MPE limit for all transmissions at frequencies greater than 3 GHz. For transmissions between 30-300 GHz, for example, the FCC MPE is set at 1 mW/cm$^2$.

The MPE tightens an already-tight link-budget of 5G mmWave uplink (UL) transmissions. One solution may be the use of proximity sensors which determine whether there is a human body part near a mmWave antenna array module. When the proximity sensor indicates open space, the wireless communication device can transmit at a higher power than when the proximity sensor indicates the presence of a human body part. If the proximity sensor indicates the presence of the human body part, the wireless communication device may back-off its UL transmission power to remain in compliance with MPE limits.

In various aspects of the disclosure, an end-user may carry out mmWave proximity sensor calibration (where antenna array modules of the wireless communication device are configured as the proximity sensors). The user may initiate a tool (or an application) on the wireless communication device. The tool may guide the user as to how the user may physically hold the wireless communication device during an open space calibration process. The method and apparatus may also have built-in mechanisms to detect when the user may be non-compliant with the provided open space calibration guidance.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided. The radio access network (RAN) 100 may implement any suitable wireless communication technology or technologies to provide radio access. As one example, the RAN 100 may operate according to 3rd Generation Partnership Project (3GPP) New Radio (NR) specifications, often referred to as 5G. As another example, the RAN 100 may operate under a hybrid of 5G NR and Evolved Universal Terrestrial Radio Access Network (eUTRAN) standards, often referred to as Long-Term Evolution (LTE). The 3GPP refers to this hybrid RAN as a next-generation RAN, or NG-RAN. Of course, many other examples may be utilized within the scope of the present disclosure.

The geographic region covered by the radio access network 100 may be divided into a number of cellular regions (cells) that can be uniquely identified by a user equipment (UE) based on an identification broadcasted over a geographical area from one access point or base station. FIG. 1 illustrates cells 102, 104, 106, and 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 100 operates according to both the LTE and 5G NR standards, one of the base stations may be an LTE base station, while another base station may be a 5G NR base station.

In FIG. 1, two base stations 110 and 112 are shown in cells 102 and 104; and a third base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the base stations 110, 112, and 114 support cells having a large size. Further, a base station 118 is shown in the cell 108, which may overlap with one or more macrocells. In this example, the cell 108 may be referred to as a small cell (e.g., a microcell, picocell, femtocell, home base station, home Node B, home eNode B, etc.), as the base station 118 supports a cell having a relatively small size. Cell sizing can be done according to system design as well as component constraints. It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes an unmanned aerial vehicle (UAV) 120, such as a quadcopter or drone, which may be configured to function as a base station. That is, in some examples, a cell may not necessarily be stationary, and the geographic area of the cell may move according to the location of a mobile base station such as the UAV 120.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The RAN 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quadcopter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the RAN 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with base station 118; and UE 136 may be in communication with mobile base station 120. Here, each base station 110, 112, 114, 118, and 120 may be configured to provide an access point to a core network (not shown) for all the UEs in the respective cells. In another example, a mobile network node (e.g., quadcopter 120) may be configured to function as a UE. For example, the quadcopter 120 may operate within cell 102 by communicating with base station 110.

Wireless communication between a RAN 100 and a UE (e.g., UE 122 or 124) may be described as utilizing an air interface. Transmissions over the air interface from a base station (e.g., base station 110) to one or more UEs (e.g., UE 122 and 124) may be referred to as downlink (DL) transmission. In accordance with certain aspects of the present disclosure, the term downlink may refer to a point-to-multipoint transmission originating at a scheduling entity (described further below, e.g., base station 110). Another way to describe this scheme may be to use the term broadcast channel multiplexing. Transmissions from a UE (e.g., UE 122) to a base station (e.g., base station 110) may be referred to as uplink (UL) transmissions. In accordance with further aspects of the present disclosure, the term uplink may refer to a point-to-point transmission originating at a scheduled entity (described further below, e.g., UE 122).

For example, DL transmissions may include unicast or broadcast transmissions of control information and/or traffic information (e.g., user data traffic) from a base station (e.g., base station 110) to one or more UEs (e.g., UEs 122 and 124), while UL transmissions may include transmissions of control information and/or traffic information originating at a UE (e.g., UE 122). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are exemplary, and any suitable scheme for organizing waveforms may be utilized, and various time divisions of the waveform may have any suitable duration.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

The air interface in the RAN 100 may utilize one or more multiplexing and multiple access algorithms to enable simultaneous communication of the various devices. For example, 5G NR specifications provide multiple access for UL or reverse link transmissions from UEs 122 and 124 to base station 110, and for multiplexing DL or forward link transmissions from the base station 110 to UEs 122 and 124 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the RAN 100 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

In the RAN 100, the ability for a UE to communicate while moving, independent of their location, is referred to as mobility. The various physical channels between the UE and the RAN are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In some examples, a RAN 100 may enable mobility and handovers (i.e., the transfer of a UE's connection from one radio channel to another). For example, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In various implementations, the air interface in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In some examples, access to the air interface may be scheduled, wherein a scheduling entity (e.g., a base station) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). For example, two or more UEs (e.g., UEs 138, 140, and 142) may communicate with each other using sidelink signals 137 without relaying that communication through a base station. In some examples, the UEs 138, 140, and 142 may each function as a scheduling entity or transmitting sidelink device and/or a scheduled entity or a receiving sidelink device to schedule resources and communicate sidelink signals 137 therebetween without relying on scheduling or control information from a base station. In other examples, two or more UEs (e.g., UEs 126 and 128) within the coverage area of a base station (e.g., base station 112) may also communicate sidelink signals 127 over a direct link (sidelink) without conveying that communication through the base station 112. In this example, the base station 112 may allocate resources to the UEs 126 and 128 for the sidelink communication. In either case, such sidelink signaling 127 and 137 may be implemented in a peer-to-peer (P2P) network, a device-to-device (D2D) network, a vehicle-to-vehicle (V2V) network, a vehicle-to-everything (V2X), a mesh network, or other suitable direct link network.

In some examples, a D2D relay framework may be included within a cellular network to facilitate relaying of communication to/from the base station 112 via D2D links (e.g., sidelinks 127 or 137). For example, one or more UEs (e.g., UE 128) within the coverage area of the base station 112 may operate as relaying UEs to extend the coverage of the base station 112, improve the transmission reliability to one or more UEs (e.g., UE 126), and/or to allow the base station to recover from a failed UE link due to, for example, blockage or fading.

Two primary technologies that may be used by V2X networks include dedicated short range communication (DSRC) based on IEEE 802.11p standards and cellular V2X based on LTE and/or 5G (New Radio) standards. Various aspects of the present disclosure may relate to New Radio (NR) cellular V2X networks, referred to herein as V2X networks, for simplicity. However, it should be understood that the concepts disclosed herein may not be limited to a particular V2X standard or may be directed to sidelink networks other than V2X networks.

Figure 2:
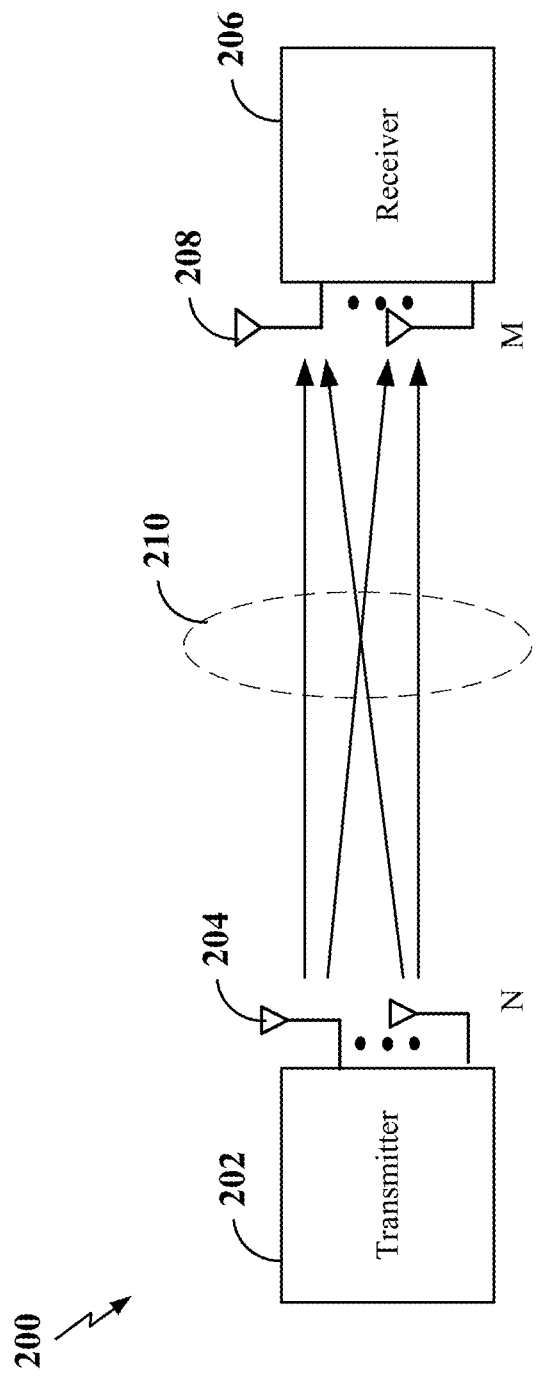
FIG. 2 is a diagram illustrating a wireless communication system supporting beamforming and/or multiple-input multiple-output (MIMO) communication according to some aspects described herein.

According to one aspect, the scheduling entity and/or scheduled entity may be configured for beamforming and/or multiple-input multiple-output (MIMO) technology. FIG. 2 is a diagram illustrating a wireless communication system 200 supporting beamforming and/or multiple-input multiple-output (MIMO) communication according to some aspects described herein. In a MIMO system, a transmitter 202 includes multiple transmit antennas 204 (e.g., N transmit antennas) and a receiver 206 includes multiple receive antennas 208 (e.g., M receive antennas). Thus, there are N×M signal paths 210 from the transmit antennas 204 to the receive antennas 208. Each of the transmitter 202 and the receiver 206 may be implemented, for example, within a scheduling entity, a scheduled entity, or any other suitable wireless communication device.

The use of such multiple antenna technology enables the wireless communication system 200 to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single wireless communication device to increase the data rate or to multiple wireless communication devices to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the wireless communication device(s) with different spatial signatures, which enables each of the wireless communication device(s) to recover the one or more data streams destined for that wireless communication device. On the uplink, each wireless communication device transmits a spatially precoded data stream, which enables the base station to identify the source of each spatially precoded data stream.

The number of data streams or layers corresponds to the rank of the transmission. In general, the rank of the MIMO system (e.g., the wireless communication system 200 supporting MIMO) is limited by the number of transmit or receive antennas 204 or 208, whichever is lower. In addition, the channel conditions at the wireless communication device, as well as other considerations, such as the available resources at the base station, may also affect the transmission rank. For example, the rank (and therefore, the number of data streams) assigned to a particular wireless communication device on the downlink may be determined based on the rank indicator (RI) transmitted from the wireless communication device to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the wireless communication device), to assign a transmission rank to the wireless communication device.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit a channel state information—reference signal (CSI-RS) with separate C-RS sequences for each layer to provide for multi-layer channel estimation. From the CSI-RS, the UE may measure the channel quality across layers and resource blocks and feed back the channel quality indicator (CQI) and rank indicator (RI) values to the base station for use in updating the rank and assigning REs for future downlink transmissions.

In the simplest case, as shown in FIG. 2, a rank-2 spatial multiplexing transmission on a 2×2 MIMO antenna configuration will transmit one data stream from each of the transmit antennas 204. Each data stream reaches each of the receive antennas 208 along a different one of the signal paths 210. The receiver 206 may then reconstruct the data streams using the received signals from each of the receive antennas 208.

Beamforming is a signal processing technique that may be used at the transmitter 202 or receiver 206 to shape or steer an antenna beam (e.g., a transmit beam or receive beam) along a spatial path between the transmitter 202 and the receiver 206. Beamforming may be achieved by combining the signals communicated via antennas 204 or 208 (e.g., antenna elements of an antenna array module) such that some of the signals experience constructive interference while others experience destructive interference. To create the desired constructive/destructive interference, the transmitter 202 or receiver 206 may apply amplitude and/or phase offsets to signals transmitted or received from each of the antennas 204 or 208 associated with the transmitter 202 or receiver 206.

In 5G New Radio (NR) systems, particularly for above 6 GHz or mmWave systems, beamformed signals may be utilized for most downlink channels, including the physical downlink control channel (PDCCH) and physical downlink shared channel (PDSCH). In addition, broadcast control information, such as the master system information block (MSIB), slot format indicator (SFI), and paging information, may be transmitted in a beam-sweeping manner to enable all scheduled entities (UEs) in the coverage area of a transmission and reception point (TRP) (e.g., a gNB) to receive the broadcast control information. In addition, for wireless communication devices configured with beamforming antenna array modules, beamformed signals may also be utilized for uplink channels, including the physical uplink control channel (PUCCH) and physical uplink shared channel (PUSCH).

Figure 3:
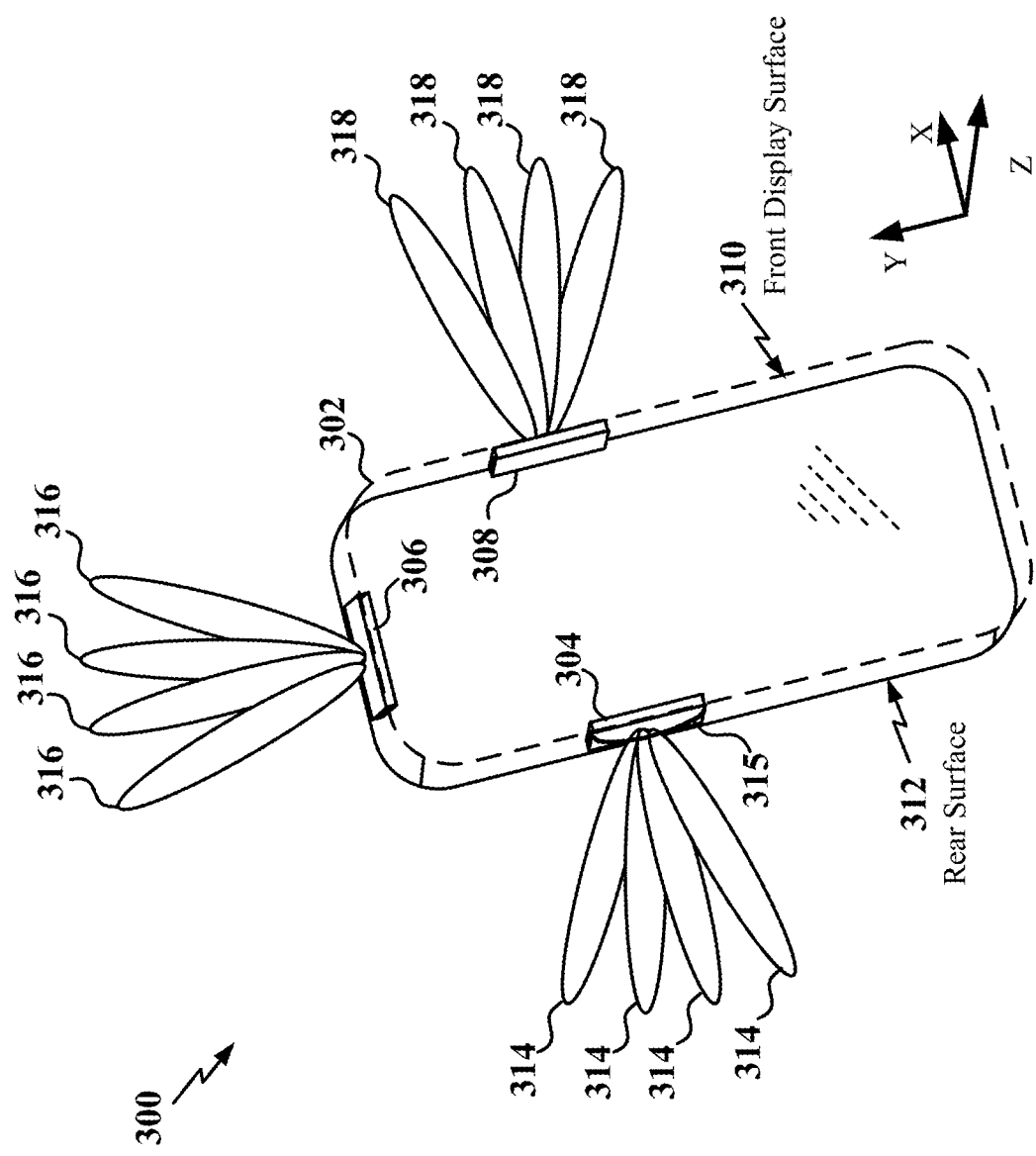
FIG. 3 is a diagram illustrating an example of a wireless communication device according to some aspects described herein.

FIG. 3 is a diagram illustrating an example of a wireless communication device 300 according to some aspects described herein. The wireless communication device 300 may be a 5G wireless communication device configured to transmit and receive signals in the mmWave frequency band (e.g., FR2 or higher). The wireless communication device 300 may include at least one antenna array module; however, it should be understood that the wireless communication device 300 may include any number of antenna array modules. In the example of FIG. 3, the wireless communication device 300 includes three antenna array modules 304, 306, 308. The respective antenna array modules 304, 306, 308 may each be a 5G mmWave antenna array module, meaning, for example, that the respective antenna array modules 304, 306, 308 can each handle the traffic, perform beamforming, and provide spatial coverage as may be specified in the 3GPP specifications pertaining to 5G and 5G New Radio (NR) operating in the mmWave frequency band (e.g., FR2 or higher).

The antenna array modules 304, 306, 308 (and associated signal and data processing circuitry) may be configured to perform beamforming toward a gNB (e.g., a scheduling entity, a base station) or to another wireless communication device (e.g., a user device, a scheduled entity) during D2D or sidelink communication. They may be configured to adjust radiated power to, for example, increase the amount of energy received at a gNB (or other wireless communication device) to improve signal-to-noise ratios, improve throughput and quality of a link between the wireless communication device and the gNB (or other wireless communication device). According to one aspect, each antenna array module 630 may be configured to operate as a proximity sensor that detects a human object's (e.g., a finger, an ear, a cheek, or other body part or body surface) contact with one or more respective antenna array modules 304, 306, 308 or detects a proximity of the human object to one or more respective antenna array modules 304, 306, 308. As used herein, a human object may be, for example.

The wireless communication device 300 may include a housing 302. The housing 302 may include a display 310 and a rear surface 312. The wireless communication device 300 may correspond to any of the wireless communication devices (e.g., scheduled entities) illustrated in FIGS. 1 and 2.

The antenna array modules 304, 306, 308 may be located in the housing 302 of the wireless communication device 300 at positions that enable each antenna array module 304, 306, 308 to cover a respective portion of a sphere surrounding the wireless communication device 300. In particular, antenna array module 304 may be configured to generate a plurality of beams 314, an antenna array module 306 may be configured to generate a plurality of beams 316, and antenna array module 308 may be configured to generate a plurality of beams 318. Each of the plurality of beams 314, 316, 318 may be directed towards a different portion of a coverage area (e.g., of the sphere) of the respective antenna array module 304, 306, 308. In one example, a wide beam 315 may additionally or alternatively be formed for transmission and/or reception. In general, a base station may communicate with the wireless communication device 300 using a respective pair of beams on both the downlink and uplink. The beam pair links (BPLs) for the downlink and the uplink may include beams from the same antenna array module 304, 306, 308, or different antenna array modules 304, 306, 308.

The number of the plurality of beams 314, 316, 318 generated per antenna array module 304, 306, 308 may depend, for example, on the number of antenna subarrays in each antenna array module 304, 306, 308. In general, to meet link budget requirements for downlink transmissions (e.g., from the gNB to the wireless communication device 300), each antenna array module 304, 306, 308 may support N beams per N antenna subarrays in the module. For example, assuming there are two antenna subarrays (N=2) per antenna array module 304, 306, 308, the wireless communication device 300 may support 2N (e.g., 2N=2*2=4) beams by each antenna array module, and 6N beams total (e.g., 3*2N=6N). Accordingly, for N=2, as shown in the example of FIG. 3, the wireless communication device 300 may support 12 total beams (e.g., four beams from each antenna array module 304, 306, 308). However, it should be understood that each antenna array module 304, 306, 308 may support any suitable numbers of beams.

On the uplink, each of the plurality of mmWave beams 314, 316, 318 produced from the antenna array modules 304, 306, 308 is a directional beam that may propagate along a beam path extending outward from the antenna array modules 304, 306, 308. Each of the antenna array modules 304, 306, 308 concentrates the radio frequency (RF) radiation (e.g., as measured in RF power density) produced from a mmWave beam in an area corresponding to a direction of a path of the mmWave beam.

The FCC has placed restrictions on the maximum permissible exposure (MPE) to human tissue from such mmWave beams. In one approach, an MPE power density threshold of a transmitting antenna array module is limited to no more than 1.0 mW/cm$^2$, 4.0 mW/cm$^2$, and/or the like. The power density may be averaged over an averaging time (e.g., an MPE time window), where the averaging time may depend on the frequency of the transmission. In one such example, the averaging time is shorter for higher frequencies. In one example, the averaging time can be 30 seconds for frequencies that range between 6 GHz to 10 GHz, 14 seconds for frequencies that range between 10 GHz to 16 GHz, 8 seconds for frequencies that range between 16 GHz to 24 GHz, 4 seconds for frequencies that range between 24 GHz to 42 GHz, 2 seconds for frequencies that range between 42 GHz to 95 GHz, and/or the like. Compliance with MPE standards may place constraints on uplink transmissions for both duty cycle and transmit power. These constraints may result in degradation in both cell coverage and user experience (e.g., call stability and throughput). Wireless communication devices can monitor and adjust power output over time to comply with exposure limits. The monitoring and adjustment of power output may be based on average exposure at a given radio frequency over a given period (e.g., an MPE time window).

The RF radiation/power density decays at a high rate with distance from the transmitting antenna. Consequently, an uplink transmission results in significantly lower exposure when human tissue is absent from the beam path or is further away from the transmitting antenna. Therefore, the use of sensing or detection capabilities of the wireless communication device 300 to determine which antenna array modules 304, 306, 308 are near human tissue may assist with conformance to FCC MPE regulations. Additionally or alternatively, when the wireless communication device 300 adjusts output power to limit exposure, a user can be prompted to move the human tissue (e.g., belonging to the fingers, thumbs, and head, in general) away from an antenna array module 304, 306, 308 so that future transmissions can be transmitted at a higher power to improve uplink signal quality after the human tissue is no longer in proximity to the antenna array module 304, 306, 308.

A wireless communication device 300 may implement proximity sensing to determine if the hand (e.g., fingers, thumb, palm) is proximate to or covering any antenna array modules 304, 306, 308. If proximate to or covering, the wireless communication device 300 may, for example, either warn the user to move the hand or reduce a transmitter power level to meet MPE regulations.

A wireless communication device may use physical parameter sensors, such as thermal sensors, capacitive sensors, display-touch sensors, infrared sensors, and cameras to implement proximity sensors. When implemented as proximity sensors, these physical parameter sensors may be referred to as "external" proximity sensors, even though they are located within the housing of a wireless communication device. However, implementations of such external proximity sensors may be bulky and power-hungry. In addition, placement of an external sensor (not shown) adjacent to one or more antenna array modules 304, 306, 308 may increase the cost and complexity of the wireless communication device 300, takes up valuable volume within the housing of the wireless communication device 600, and takes up valuable real estate on a circuit board within the housing of the wireless communication device 300. Furthermore, an inherent behavior of the mmWave frequency band warrants wireless communication devices to install multiple mmWave antenna array modules. Hence to implement proximity detection, a wireless communication device may install an external proximity sensor next to each mmWave antenna array module. The above-described negative aspects of using physical parameter sensors as external proximity sensors make their use undesirable in mmWave enabled wireless communication devices.

One alternative involves using mmWave proximity sensors integrated into a radio communication RF chip. Besides advantages in saving printed circuit board real-estate and power consumption, integrated mmWave proximity sensors also allow faster rate sensing and higher reliability than external sensors.

However, integrated mmWave proximity sensors are extremely sensitive to the mechanical housing of the antenna array module. Higher mechanical tolerances can arise due to manufacturing variations and can significantly degrade the performance of the integrated mmWave proximity sensor.

A factory open space calibration of a mmWave proximity sensor may alternatively be performed. Factory open space calibration may preserve high detection performance. However, factory open space calibration may involve the use of an anechoic chamber, which might be large and costly to build, operate, and maintain. Also, factory open space calibration may have limited value because such calibration does not account for protective covers that end-users may place over the sides, back, and/or front of a wireless communication device. The protective cover may affect the accuracy of the factory open space calibration.

Figure 4:
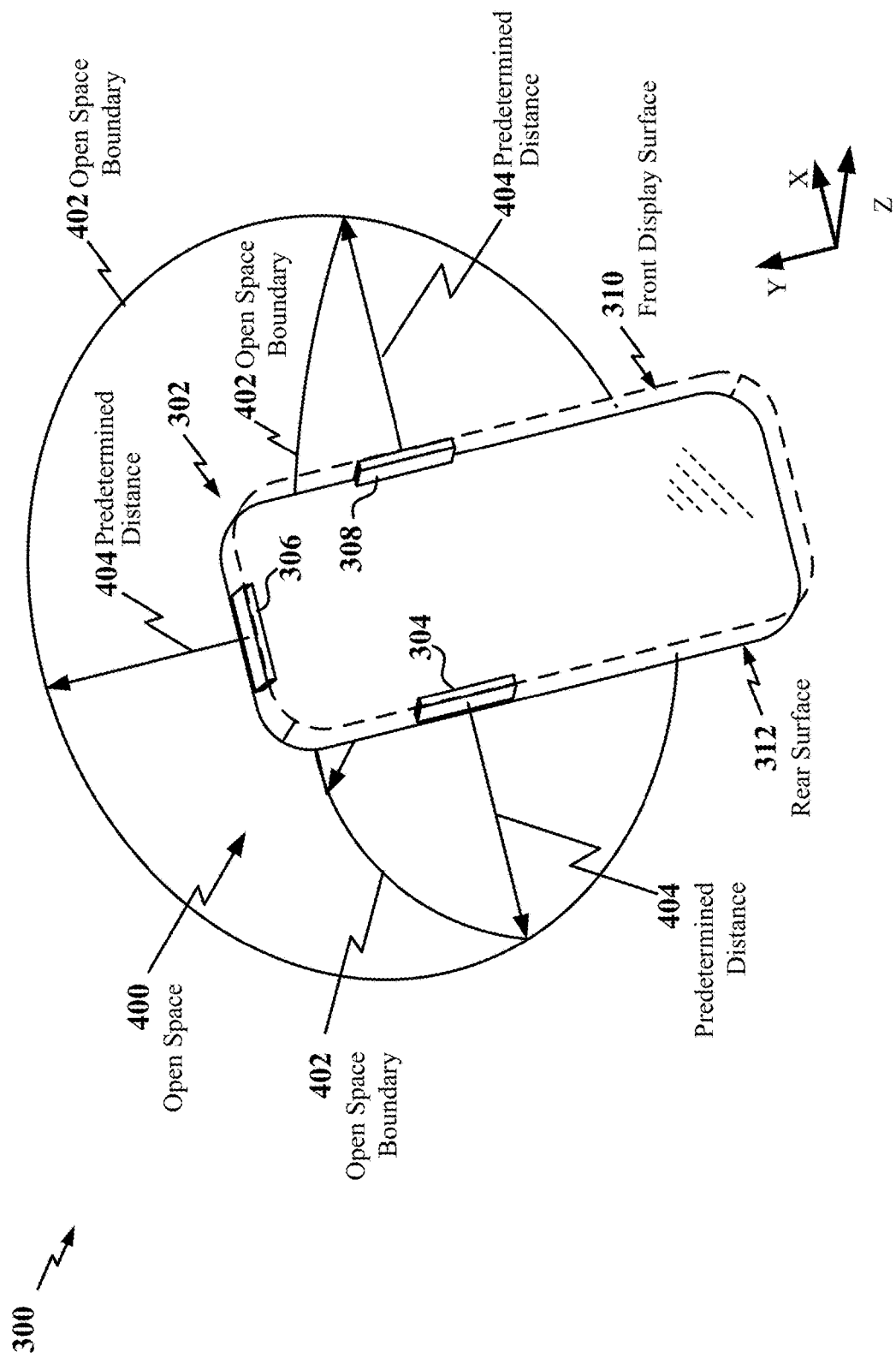
FIG. 4 is a diagram illustrating the example of the wireless communication device of FIG. 3 positioned within an imaginary hemisphere representative of open space, according to some aspects described herein.

FIG. 4 is a diagram illustrating the example of the wireless communication device 300 of FIG. 3 positioned within an imaginary hemisphere representative of open space according to some aspects described herein. The imaginary hemisphere may enable visualization of an open space 400 surrounding the wireless communication device within the imaginary hemisphere. FIG. 4 depicts the imaginary hemisphere with a fixed open space boundary 402 only for ease of illustration.

The open space boundary 402 may extend a predetermined distance 404 from the antenna array modules 304, 306, 308. The predetermined distance 404 may be about 30-60 cm or more particularly about 30-40 cm in some examples. In other examples, the predetermined distance may be about an arm's length away from the antenna array module. In other examples, each predetermined distance 404 may include a respective range of distances from each antenna array module 304, 306, 308, or from a center of the wireless communication device 300. In one example, each predetermined distance 404 or range of distances may extend outward from the antenna array module 304, 306, 308 along the beam path of the respective antennas. In some examples, the range of distances may be variable based on, for example, the transmit power of the antenna array module 304, 306, 308. Respective predetermined distances or respective ranges of predetermined distances may be different from one another. These preceding descriptions of predetermined distances and distance ranges are exemplary and non-limiting. For practical purposes, the open space boundary 402 may be an amorphous spheroid shape that surrounds the wireless communication device 300.

In the examples described herein, for both open space calibration and proximity detection, the wireless communication device 300 may radiate a proximity test signal from each of the antenna array modules 304, 306, 308 into the open space 400. Prior to being configured as a proximity sensor, a respective antenna array module 304, 306, 308 may be calibrated to the open space 400. The volume of space within the open space 400 may be used for open space calibration. The open space 400 may also be referred to as natural open space.

The wireless communication device 300 may configure at least one of a plurality of antennas of a respective antenna array module 304, 306, 308 to transmit a proximity test signal from the respective antenna array module 304, 306, 308 into the open space 400 (e.g., the open space devoid of objects). The wireless communication device 300 may also configure at least two other cross-polarized antennas of the respective antenna array module 304, 306, 308 to receive a version (e.g., reflected, perturbed, unperturbed) of the proximity test signal. Transmission of the proximity test signal and reception of the version of the proximity test signal may occur simultaneously. According to some aspects, the received version of the proximity test signal may be an unperturbed version of the transmitted proximity test signal when measured during open space calibration in compliance with open space calibration instructions (e.g., holding wireless communication device about 30-60 cm from any object, including human objects). According to some aspects, the received version of the proximity test signal may be a perturbed version of the transmitted proximity test signal when the respective antenna array module 304, 306, 308 is configured as a proximity sensor and an object is in proximity to or covering the respective antenna array module 304, 306, 308.

The received version of the proximity test signal may be referred to herein as a first signal received at cross-polarized antennas of the respective antenna array module 304, 306, 308. The first signal may be represented with complex values for each of the cross-polarized receive antennas. When measured in compliance with open space calibration instructions, the first signal received at the cross-polarized antennas may be referred to herein as the open space calibration value. When measured during proximity sensor operation, the first signal received at the cross-polarized antennas may be referred to herein as the measured open space value. These values may be stored in the memory 610 of the wireless communication device 600. For example, in the memory 610 of the wireless communication device 600 of FIG. 6, the open space calibration value may be stored in an open space calibration value register 631. The measured open space value may be stored in a measured open space value register 632. The words value and values may be used interchangeably. One or more values, including one or more complex, real and imaginary, and/or magnitude and angle values, for example may be stored in any register described herein.

Antennas of respective antenna array modules 304, 306, 308 that are configured to receive the version of the proximity test signal during open space calibration should not receive any reflected proximity test signal transmitted into the open space 400. The absence of reflections results because there are no objects in the open space 400 during calibration from which to receive a reflected version of the proximity test signal or a perturbed version of the proximity test signal. Accordingly, any signal (e.g., the first signal) received during open space calibration may be attributed to leakage of the unperturbed proximity test signal from a transmit antenna to the cross-polarized receive antennas. Similarly, any signal received during proximity sensor operation may be attributed to leakage of the perturbed proximity test signal from a transmit antenna to the cross-polarized receive antennas. In both open space calibration operation and proximity sensor operation, the proximity test signal may be transmitted at a level that may be tens of dBs above the background noise and/or noise of the receivers in the receiver chains of the cross-polarized antennas themselves. The amplitude of the received signals at each of the cross-polarized antennas may be correspondingly above the noise and may be in the linear region of amplifiers in the receiver chains. Therefore, the wireless communication device may use the signal received during open space calibration as a threshold level or value. The differences (e.g., in amplitude and phase) between the versions of the proximity test signals received at the cross-polarized antennas and the proximity test signal transmitted from the transmit antenna is attributed to an object occupying a space in proximity to the antenna array module (within the open space) or in contact with the antenna array module. Such objects include those having human tissue, including the fingers, thumbs, palms, and head. For ease of reference, these tissue-bearing features of the human anatomy may generally be referred to herein as human objects.

Figure 5:
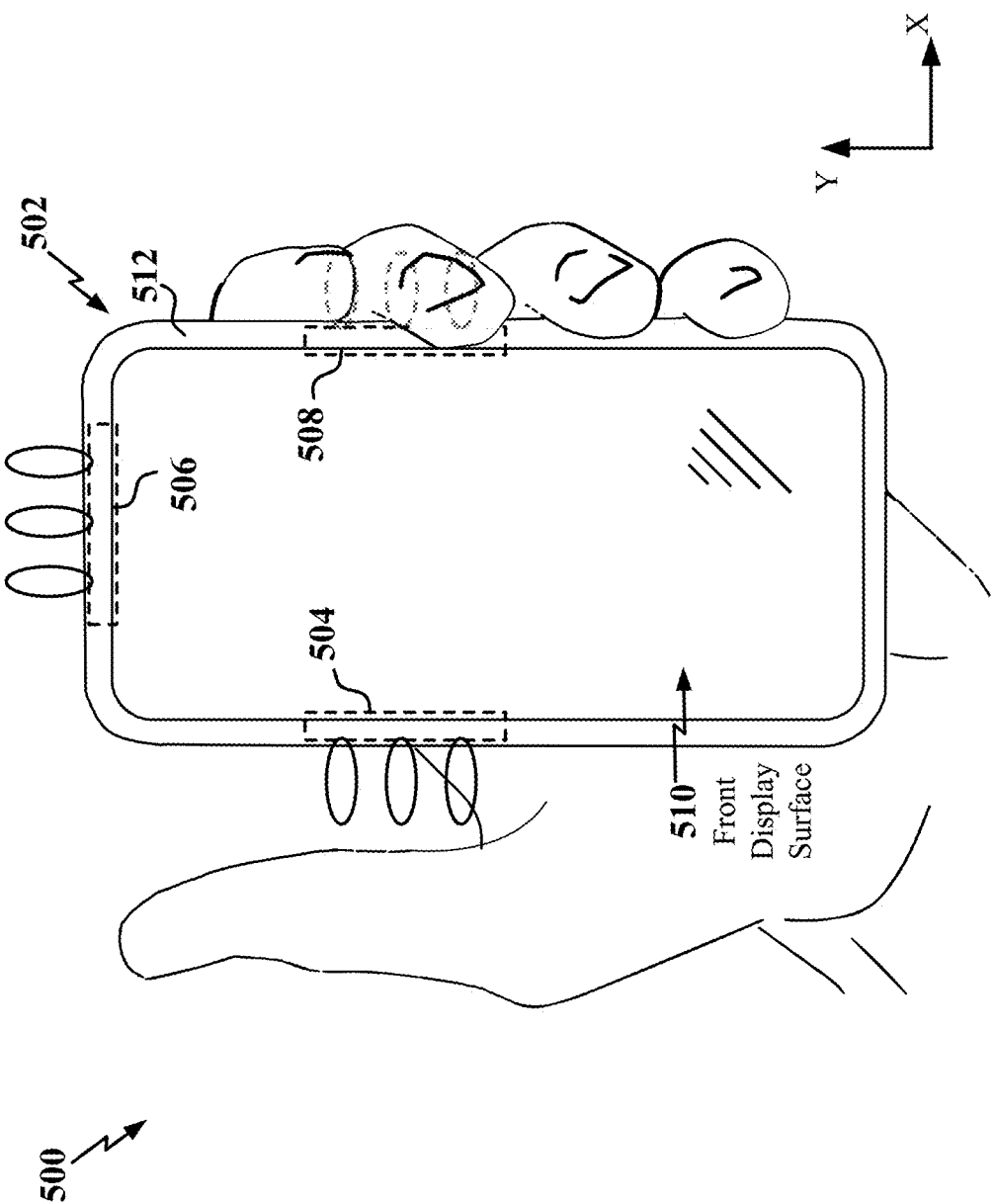
FIG. 5 is a diagram illustrating a wireless communication device configured to sense a proximity of a human object to, or contact by the human object with, an antenna array module, according to some aspects described herein.

FIG. 5 is a diagram illustrating a wireless communication device 500 configured to sense a proximity of a human object to, or contact by the human object with, an antenna array module 504, 506, 508, according to some aspects described herein. The wireless communication device 500 includes a housing 502. The housing 502 may be partially enclosed within and coupled to a protective cover 512. The wireless communication device 500 includes three antenna array modules 504, 506, 508 within the housing 502. The antenna array modules 504, 506, 508 are positioned along the left side, top, and right side of the wireless communication device 500, within the housing 502, and adjacent to and at least partially covered by the protective cover 512. The wireless communication device 500 includes a display 510, which lies in the X-Y plane. The rear surface of the wireless communication device 500 is hidden from view. The protective cover 512 may enclose the (hidden) rear surface and at least some portion of the sides of the wireless communication device 500. One or more additional antenna array modules (not shown) may be mounted adjacent to the rear surface (not shown) of the wireless communication device 500 within the housing 502 of the wireless communication device and adjacent to the protective cover 512.

In the example of FIG. 5, the antenna array modules 504, 506, 508 are each configured as an antenna array module proximity sensor. To configure an antenna array module 504, 506, 508 as an antenna array module proximity sensor, at least one antenna of each given antenna array module 504, 506, 508 may be configured to transmit the proximity test signal. At least two other cross-polarized antennas of the given antenna array module 504, 506, 508 may be configured to receive leakage from the transmit antenna in the form of cross-polarized versions of the proximity test signal. The cross-polarized received versions of the proximity test signal may be unperturbed (e.g., during open space calibration) or perturbed (during proximity sensor operation when an object may be in proximity to or covering a respective antenna array module 504, 506, 508). Using the antenna array modules 504, 506, 508 as proximity sensors obviates a need to use one or more separate physical parameter sensors, such as physical parameter sensors 624 of FIG. 6, as proximity sensors. Nevertheless, physical parameter sensors may be used for other purposes.

According to aspects described herein, for purposes of proximity detection, it may not be necessary to indicate that contact with an object (e.g., a human object or a protective cover) occurred or to provide a specific distance between an object and a given antenna array module 504, 506, 508. For purposes of proximity detection, it may be sufficient to detect a proximity of a protective cover over an antenna array module 504, 506, 508, or proximity of a human object relative to the antenna array module 504, 506, 508.

In FIG. 5, for ease of illustration, the display 510 of the wireless communication device 500 and an anterior plane of the user's face lie in parallel or substantially parallel X-Y planes. The user's visual axis may be along the Z-axis, perpendicular to the X-Y planes. This orientation is merely an example, and it should be understood that other orientations may be utilized by the processes or apparatus described herein.

In FIG. 5, the user's left-hand grips the wireless communication device 500 such that a middle finger of the user's hand is covering at least a portion of the antenna array module 508. The user's index finger is adjacent to the antenna array module 508. The user's left thumb is in proximity to the antenna array module 504. In this orientation, the user's thumb would be within the open space 400 described in FIG. 4. The position of the user's fingers and thumb would be sufficient to cause a cross-polarization perturbation of each of the proximity test signals received at the left antenna array module 504 and the right antenna array module 508 to be different from an open space cross-polarization perturbation previously measured (without the user's fingers and thumb proximate to any of the antenna array modules 504, 506, 508).

In one example, at antenna array module 504, two receive antennas having different polarizations, one relative to the other (e.g., cross-polarization), may receive a proximity test signal (e.g., the electromagnetic field of the proximity test signal) transmitted from at least one transmit antenna of antenna array module 504. During open space calibration, the wireless communication device 500 transmits the proximity test signal into open space. The open space is free of any object that might perturb the proximity test signal. For example, in an open space environment, little if any reflected energy may be received at the two receive antennas; also, the radiated transmission in the vicinity of the two receive antennas may not be perturbed by any object in the open space. On the other hand, when an object (e.g., a thumb) is within the area defined as the open space or is in contact with the antenna array module 504, the presence of the object perturbs the transmitted proximity test signal. The perturbation causes a value representative of the received proximity test signal at the cross-polarized receive antennas to be different from that measured in the open space environment (e.g., during open space calibration).

In one example of an antenna array module 504, 506, 508, there may be four antenna elements. The ports of each antenna element may be either horizontally polarized or vertically polarized. Accordingly, in a four-antenna configuration, two antennas may have vertical polarization, and two antennas may have horizontal polarization. A greater or lesser number of antenna array modules, different numbers of antennas per antenna array module, different distributions of antenna polarization, and even diverse types and combinations of polarization, such as vertical, horizontal, and circular polarizations, are within the scope of the disclosure. In aspects described herein, the proximity test signal may be transmitted from at least one antenna of each respective antenna array module 504, 506, 508. The proximity test signal may be received by at least two other cross-polarized antennas of each respective antenna array module 504, 506, 508. The cross-polarization refers to a first antenna that may be horizontally polarized and a second antenna may be vertically polarized, for example.

As described above, to comply with MPE limits, a wireless communication device 500 may need to know (e.g., detect, determine) if an object (e.g., a human object) lies in proximity to, or covers, at least one of the antenna array modules 504, 506, 508. If an object lies in proximity to or covers at least one of the antenna array modules 504, 506, 508, the wireless communication device 500 may need to reduce transmitter output power to remain within the MPE limits. Compliance with the MPE limits may protect the health of a user by not subjecting any tissue of the user to excessive power in the mmWave frequency band (e.g., FR2 and above).

Figure 8:
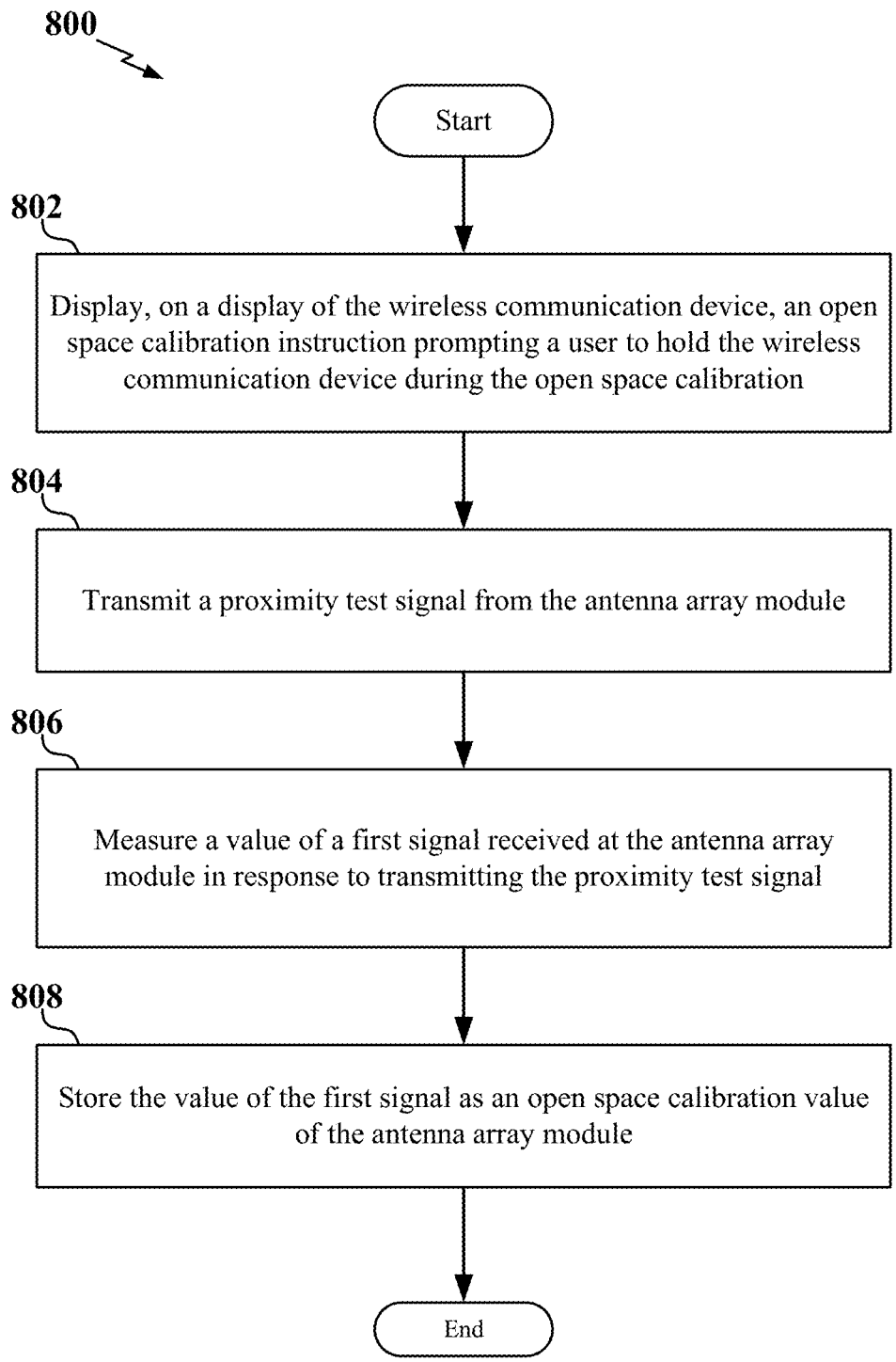
FIG. 8 is a flow diagram illustrating an open space calibration process according to some aspects described herein.
Figure 9:
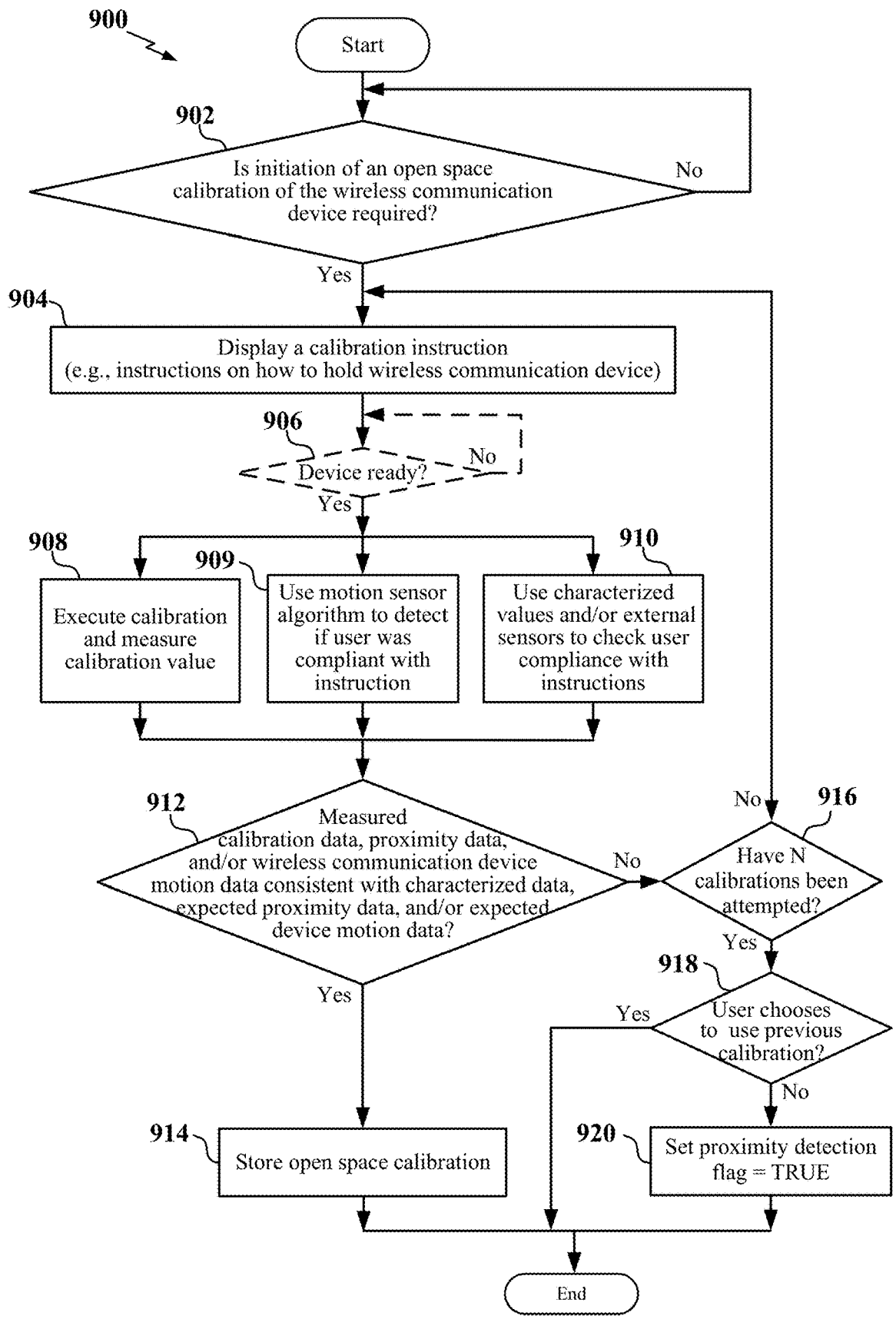
FIG. 9 is a flow diagram illustrating another open space calibration process according to some aspects described herein.

In some examples, the wireless communication device 500 may initiate an antenna array module proximity sensor calibration to open space (e.g., an open space calibration process, similar to open space calibration process 800 of FIG. 8 or 900 of FIG. 9) to calibrate the antenna array modules 504, 506, 508 for use as antenna array module proximity sensors, when the wireless communication device 500 is brought online (e.g., booted-up, turned on, energized).

In other examples, the wireless communication device 500 may initiate an open space calibration process upon receiving an input from a user (e.g., via user interface 616 of FIG. 6) indicative of either, for example, and without limitation, a change to a protective cover model number, or a command to perform the open space calibration process. Upon receipt of these exemplary indications, driven by user input, or any other indication related to a user input relevant to open space calibration, the wireless communication device 500 may initiate the open space calibration process.

In another example, the wireless communication device 600 may initiate an open space calibration process in response to detecting the coupling, placement, or replacement, of a protective cover with or on the wireless communication device 500 or otherwise receiving an indication that a protective cover may be placed on a wireless communication device.

A wireless communication device 500 may detect the placement of the protective cover on the wireless communication device 500 in several ways. For example, the wireless communication device 500 may be provided with open space calibration data that approximates an expected open space signature of the wireless communication device 500 (e.g., a so-called "naked phone") or an expected open space signature of a given cover (or a transform, to convert the naked phone signature of the wireless communication device to that of the wireless communication device with the given cover). The provided open space calibration data may be obtained from characterizations of many wireless communication devices of the same model (e.g., tens, or hundreds, or thousands of averaged characterizations). The provided open space calibration data may be referred to herein as characterized open space calibration values. The characterized open space calibration values may be stored, for example, in a characterized open space calibration value register (e.g., 634 of FIG. 6). Factory-provided open space calibration values may be useful to detect when a cover is coupled with the wireless communication device. The wireless communication device may use the factory-provided characterized open space calibration values for comparison with the user-measured open space calibration values. The wireless communication device may detect that a new protective cover is coupled with the wireless communication device if the factory-provided characterized open space calibration values and the user-measured open space calibration values are different from one another by more than a predetermined value.

Another way of detecting a presence of a new cover or a replacement of a cover on a wireless communication device may be implemented with a radio frequency identification (RFID) device (e.g., the RFID device 618 of FIG. 6) integrated into the wireless communication device. According to such an aspect, the RFID device may read an RFID tag adhered to or embedded in a protective cover as the protective cover is coupled to the wireless communication device. The reading of an RFID tag associated with a protective cover may cause the wireless communication device to perform the open space calibration process, such as open space calibration process 800 of FIG. 8 or 900 of FIG. 9, for example. Other ways to begin, initialize, or trigger an open space calibration process are within the scope of the disclosure.

Once calibrated to the open space, the antenna array module (configured as the antenna array module proximity sensor) may be able to detect a presence of a human object in contact with or proximate to the antenna array module. Detection may be facilitated by understanding that perturbations received at cross-polarized receive antennas of the antenna array module, when induced by a finger placed over the antenna array module, for example, will be different from, and greater than, the perturbations measured (and recorded) during open space calibration of the wireless communication device 500.

Figure 6:
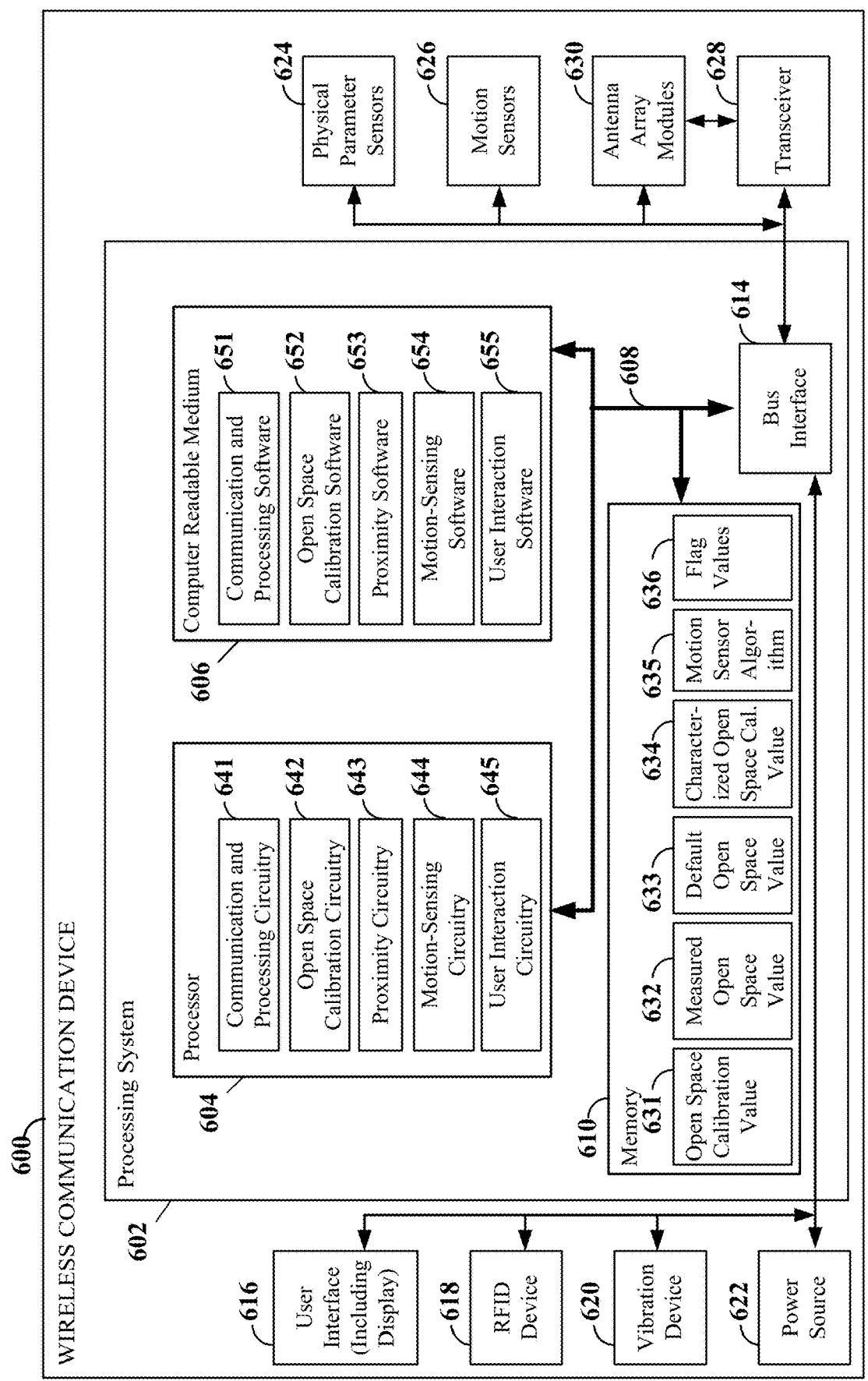
FIG. 6 is a diagram illustrating an example of a hardware implementation for a wireless communication device employing a processing system, according to some aspects described herein.

FIG. 6 is a diagram illustrating an example of a hardware implementation of a wireless communication device 600 employing a processing system 602, according to some aspects described herein. For example, the wireless communication device 600 may be any user equipment or scheduled entity shown and described above with reference to FIGS. 1 through 5.

The wireless communication device 600 may be implemented with a processing system 602 that includes one or more processors 604. Examples of processors 604 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless communication device 600 may be configured to perform any one or more of the functions described herein. That is, the processor 604, as utilized in the wireless communication device 600, may be used to implement any one or more of the processes and procedures described below.

In this example, the processing system 602 may be implemented with a bus architecture, represented generally by the bus 608. The bus 608 may include any number of interconnecting buses and bridges depending on the specific application of the processing system 602 and the overall design constraints. The bus 608 links together various circuits, including one or more processors (represented generally by the processor 604), a memory 610, and computer-readable media (represented generally by the computer-readable medium 612). The bus 608 may also link various other circuits such as timing sources, voltage regulators, and power management circuits, which are well known in the art, and therefore, will not be described any further.

A bus interface 614 provides an interface between the bus 608 and a transceiver 628. The transceiver 628 provides a means for communicating with various other apparatus over a transmission medium (e.g., air interface). The transceiver 628 may further be coupled to one or more antenna array modules 630. In some examples, the transceiver 628 and antenna array modules 630 may be configured to transmit and receive in the mmWave frequency band (e.g., FR2) using directional beamforming (e.g., using a single beam or a beam pair link (BPL) on each of the uplink and downlink). The bus interface 614 further provides an interface between the bus 608 and a user interface 616 (e.g., keypad, display, touch screen, speaker, microphone, control knobs, etc.).

One or more antenna array modules 630 of a wireless communication device 600 may be configured as antenna array module proximity sensors. The one or more antenna array modules 630 may be configured to transmit and receive proximity test signals. The proximity test signals may be perturbed by a human object within the open space defined for the wireless communication device 600. The perturbation may be measured by the wireless communication device 600 and utilized to detect a human object's proximity to the one or more antenna array modules 630. In some examples, the one or more antenna array modules 630 may correspond to the antenna array modules 304, 306, 308, shown in FIGS. 3 and 4 or the antenna array module 504, 506, 508, shown in FIG. 5.

The bus 608 may also link various peripherals. The peripherals may include a radio frequency identification (RFID) device 618. The RFID device 618 may be utilized in conjunction with a protective cover having an RFID tag coupled thereto. When a protective cover having an RFID tag is coupled to the wireless communication device 600, the RFID device 618 may sense the RFID tag and may signal the processing system 602 to provide the processing system 602 with an indication that the protective cover may be coupled to the wireless communication device 600. According to some examples, the signal may also convey information regarding, for example, the manufacturer and model number of the protective cover. The open space calibration circuitry 642 of the processor 604 of the processing system 602 may utilize this information to alter, modify, or transform an open space calibration value measured during an open space calibration process. The proximity circuitry 643 of the processor 604 of the processing system 602 may utilize this information to alter, modify, or transform a measured open space value measured during proximity sensor operation.

The peripherals may include a vibration device 620. The vibration device 620 may be configured to cause a vibration of the wireless communication device 600. The vibration may constitute haptic feedback provided by the wireless communication device 600 to the user. For example, during open space calibration, the wireless communication device 600 may display an instruction that instructs a user to change the user's grip on the wireless communication device 600. The instruction may instruct the user to hold the wireless communication device 600 below a line displayed on a display of the wireless communication device 600. The wireless communication device 600 may sense that the user's fingers are above the line (for example, using a capacitive touch-sensitive feature associated with the display). In this circumstance, the wireless communication device 600 may cause the vibration device 620 to vibrate, thus alerting the user of non-compliance with the displayed instructions.

The peripherals may include a power source 622, which is well known in the art, and therefore, will not be described any further.

The peripherals may include physical parameter sensors 624, such as thermal sensors, capacitive sensors, display-touch sensors, infrared sensors, and cameras. The physical parameter sensors 624 are well known in the art and will not be described any further.

Peripherals may also include one or more motion sensors 626 (e.g., accelerometers, gyroscopes). The motion sensors 626 may be used to determine acceleration changes along and angular acceleration about in each of the six degrees of freedom of the wireless communication device 600. According to some aspects, the wireless communication device 600 may use the motion sensors 626 to determine whether a user may be holding the wireless communication device in compliance with open space calibration instructions. The motion sensors 626 may be used to detect the motion of the wireless communication device 600 during a calibration process. A wireless communication device exhibiting a lack of motion during the open space calibration process is indicative of non-compliance with open space calibration instructions. The motion may include micro-motion induced by a user's heartbeat and detected by an antenna array module 630 when the user's finger or thumb covers the antenna array module 630.

The processor 604 may be responsible for managing the bus 608 and general processing, including the execution of software stored on the computer-readable medium 612. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software, when executed by the processor 604, causes the processing system 602 to perform the various functions described below for any particular apparatus. The computer-readable medium 612 and the memory 610 may also be utilized for storing data that may be manipulated by the processor 604 when executing software.

The computer-readable medium 612 may be a non-transitory computer-readable medium. The non-transitory computer-readable medium may store computer-executable code (e.g., software), comprising code for causing the wireless communication device 600 to perform the various functions described below for any particular apparatus. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 612 may reside in the processing system 602, external to the processing system 602, or distributed across multiple entities including the processing system 602. The computer-readable medium 612 may be embodied in a computer program product. By way of example, a computer program product may include a computer-readable medium in packaging materials. In some examples, the computer-readable medium 612 may be part of the memory 610. Those skilled in the art will recognize how best to implement the described functionality presented throughout this disclosure depending on the particular application and the overall design constraints imposed on the overall system.

According to one aspect, the processor 604 may include circuitry configured for various functions. For example, the processor 604 may include communication and processing circuitry 641 configured to communicate with a base station. In some examples, the communication and processing circuitry 641 may include one or more hardware components that provide the physical structure that performs processes related to wireless communication (e.g., signal reception and/or signal transmission) and signal processing (e.g., processing a received signal and/or processing a signal for transmission). In some examples, the communication and processing circuitry 641 may be configured to generate and transmit an uplink signal at a mmWave frequency via the transceiver 628 and antenna array module 630. In addition, the communication and processing circuitry 641 may be configured to receive and process a downlink mmWave signal via the antenna array module 630 and the transceiver 628. The communication and processing circuitry 641 may further be configured to execute communication and processing software 651 stored on the computer-readable medium 612 to implement one or more functions described herein.

The processor 604 may further include open space calibration circuitry 642. The open space calibration circuitry 642 may be used by the wireless communication device 600 to perform or run an open space calibration process to record an open space calibration value (e.g., a measure of cross-polarization perturbations) measured during the execution of the open space calibration process. In one aspect, the open space calibration circuitry 642 may transmit a proximity test signal from an antenna array module 630. from the antenna array module 630 into the open space. The open space calibration circuitry 642 may also measure a value of a first signal received at the antenna array module 630 in response to transmitting the proximity test signal. The open space calibration circuitry 642 may obtain a value of a first signal received at a pair of cross-polarized antennas (e.g., the measure of the cross-polarization perturbations) at the antenna array module 630 in response to transmitting the proximity test signal. The open space calibration circuitry 642 may also store the value of the first signal as the open space calibration value in an open space calibration value register 631 of the memory 610. The first signal may be representative of a received unperturbed version of the transmitted proximity test signal at the cross-polarized antennas, where the absence of perturbation results from the open space associated with the wireless communication device being devoid of objects (e.g., including human objects). The open space calibration circuitry 642 may further be configured to execute open space calibration software 652 stored on the computer-readable medium 612 to implement one or more functions described herein.

The processor 604 may further include proximity circuitry 643, configured to determine whether an object (e.g., a human object) may be within an open space as defined and described in connection with FIG. 4. The proximity circuitry 643 may further be configured to determine whether the object (e.g., a human object or a protective cover) may be covering an antenna array module 630. In addition, the proximity circuitry 643 may be configured to determine whether an open space calibration might be performed in view of, for example, a first installation of a protective cover on the wireless communication device 600, replacement of the protective cover on the wireless communication device 600, or a command from a user.

In some examples, the proximity circuitry 643 may be configured to obtain measurements of cross-polarization perturbations received by a plurality of cross-polarized receive antennas of the antenna array modules 630 and to store a measured value of the cross-polarization perturbations in a measured open space value register 632 or other location of the memory 610. The measured open space value may be obtained during an open space calibration or proximity sensor operation. As used herein, an open space value obtained during an open space calibration process may be referred to as an open space calibration value. In contrast, an open space value obtained during proximity sensor operation may be referred to as an open space value.

In another example, a factory may measure an open space value for a given wireless communication device model without a protective cover. This open space value may be referred to herein as a default open space value. The factory may, for example, pre-store the default open space value in a default open space value register 633 or another location of the memory 610.

In another example, the factory may characterize the open space performance of a given model of wireless communication device (such as wireless communication device 600). The characterization may be obtained, for example, by averaging a plurality of open space calibration values collected from tens or hundreds of wireless communication devices of the same model. The factory may pre-store the characterized open space calibration values of a given model of the wireless communication device 600 in a characterized open space calibration value register 634 or other location of the memory 610 of the wireless communication device 600. An open space calibration value obtained by a user during an open space calibration process may be compared to the factory-provided default open space value and/or the factory-provided characterized open space calibration values to determine if the user obtained open space calibration value is consistent with the factory-provided open space values. Characterization may also be performed on associated pairings of wireless communication device models coupled to protective covers.

The proximity circuitry 643 may further be configured to compare a new measured value of cross-polarization perturbations to a previously stored open space calibration value. For example, comparing the new measured open space value to a previous stored measured open space value may be used to ensure consistency of measurement over time. A lack of consistency may indicate that a protective cover may be absent (e.g., when the previously stored measured open space value or open space calibration value was obtained with a protective cover). A lack of consistency may alternatively indicate that a new protective cover replaced a previously used protective cover, non-compliance with open space calibration instructions, or damage to the wireless communication device.

Comparing the new measured open space value of a wireless communication device with a protective cover to a default open space value (of the respective wireless communication device model without a protective cover) may be used to determine a presence of a protective cover. Comparing the new measured open space value of a wireless communication device without a protective cover to the default open space value (of the respective wireless communication device model without a protective cover) may be used to measure degrees of uniformity between a present condition of the wireless communication device and a factory new condition of the respective wireless communication device model. Comparing the new measured open space value of a given antenna array module to a characterized open space calibration value of a given model of the respective antenna array modules (found in the wireless communication device under test) may be used to determine if one or more antenna array modules are damaged.

The proximity circuitry 643 may further be configured to execute proximity software 653 stored on the computer-readable medium 612 to implement one or more of the functions described herein.

The processor 604 may further include motion-sensing circuitry 644. The motion-sensing circuitry 644 may utilize inputs from the motion sensors 626. The motion-sensing circuitry 644 may be configured to measure movement (e.g., acceleration, rotation) and orientation (e.g., vertical, horizontal orientation) of the wireless communication device 600 during open space calibration of the antenna array modules 630. The motion of the wireless communication device 600 may be used to determine if a user complied with open space calibration instructions or other instructions incidental to proximity sensor operation. For example, if a user placed the wireless communication device on a tabletop and executed the open space calibration process, the immediate adjacency of the wireless communication device and the table would result in a unique collection of open space calibration values returned by an open space calibration process, which was different from both the default open space calibration value and the characterized open space calibration values. That deviation from expected results, in connection with motion measurements indicative of a stationary wireless communication device, could be used by the wireless communication device to conclude (e.g., determine) that compliance with open space calibration instructions may be lacking. The motion-sensing circuitry 644 may further be configured to execute motion-sensing software 654 stored on the computer-readable medium 612 to implement one or more functions described herein.

The processor 604 may further include user interaction circuitry 645. The user interaction circuitry 645 may be used by the wireless communication device 600 to display, on a display of the wireless communication device (e.g., a display included with the user interface 616), an open space calibration instruction prompting a user to hold the wireless communication device 600 during the open space calibration of the wireless communication device 600. In some aspects, the user interaction circuitry 645 may be used to display an instruction to hold the wireless communication device 600 without covering the antenna array module 630 and ensure that no object is within a given distance of the wireless communication device 600 in each of a plurality of directions from the wireless communication device 600. The user interaction circuitry 645 may further be configured to execute user interaction software 655 stored on the computer-readable medium 612 to implement one or more functions described herein.

In general, the memory 610 of the wireless communication device 600 may include the open space calibration value register 631, the measured open space value register 632, the default open space value register 633, and the characterized open space calibration value register 634. Each of the values stored in the registers may be one or more complex numbers and may be representative of the cross-polarized perturbations of the proximity test signal in the horizontal and vertical polarizations. The preceding values were described above in connection with FIG. 6. The descriptions will not be repeated for the sake of brevity.

Memory 610 may also include a motion sensor algorithm register 635. The motion sensor algorithm stored in the motion sensor algorithm register 635 may use metrics such as at least one of: variance, auto-correlation, or higher-order moments to quantify and/or detect motion in open space calibration data (e.g., in the values of the perturbation data over time). The period for determining the variance, auto-correlation, or higher-order moments may be as short as about a few hundred milliseconds or as long as about several minutes. According to some aspects, the wireless communication device may perform a combination of variance, auto-correlation, higher-order moments, or other statistical operations during an open space calibration process and also during proximity sensor operation. The motion sensor algorithm may evaluate its input and, based on statistical operations that may include one or more of variance, auto-correlation, and higher-order moments, indicate whether the user was compliant with the instructions. Non-compliance with the instructions may result in a display of additional instructions, which may cause the user to repeat the open space calibration process.

Figure 7B:
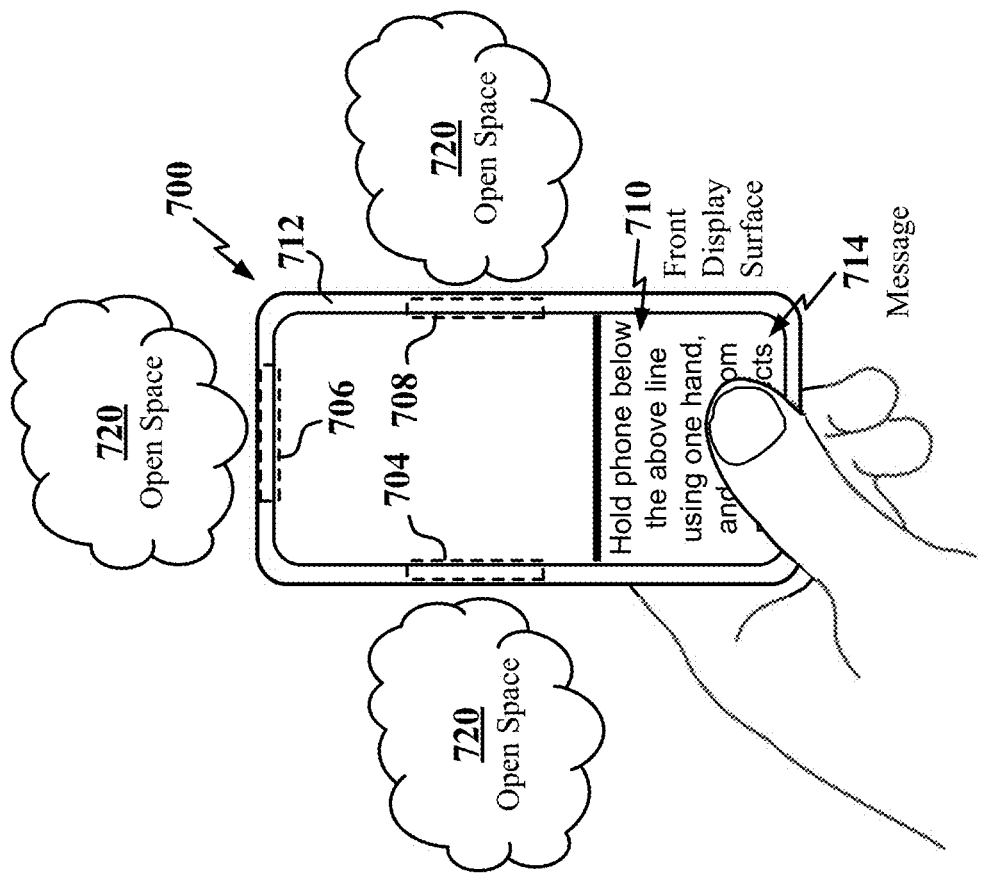
FIG. 7A and FIG. 7B illustrate a wireless communication device in a hand of a user according to some aspects described herein.
Figure 7A:
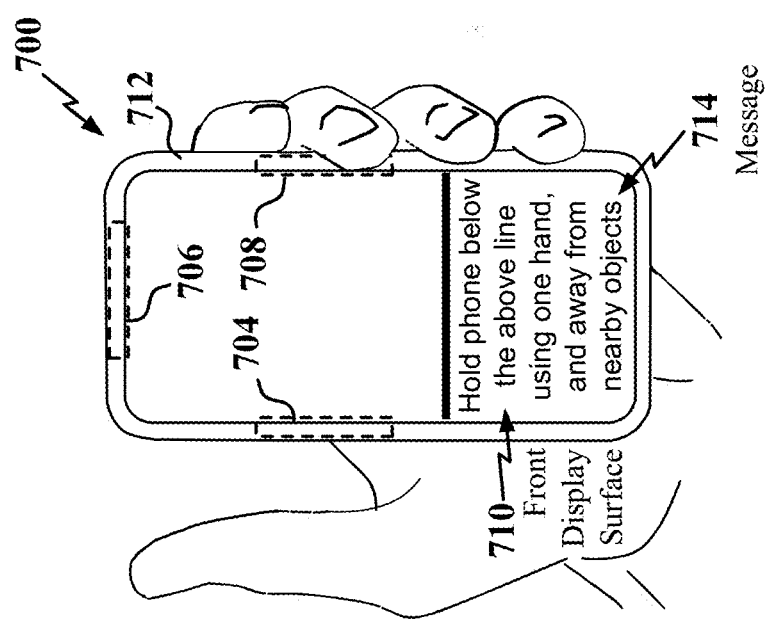

FIG. 7A and FIG. 7B illustrate a wireless communication device 700 in a hand of a user according to some aspects described herein. In both figures, the wireless communication device 700 is within (e.g., coupled to) a protective cover 712. The protective cover 712 may be coupled to on the wireless communication device 700, for example, before the initialization of the wireless communication device 700 by the user. The initialization may occur when or shortly after the wireless communication device 700 is brought online after purchase by the user. The initialization may occur within, for example, minutes or hours of the purchase. Alternatively, the protective cover 712 may be coupled to the wireless communication device 700, for example, as a replacement of a prior protective cover. Alternatively, the protective cover 712 may be coupled to the wireless communication device 700, for example, hours, days, weeks, months, or years following a first initialization of the wireless communication device 700 and/or after a substantially similar time since the performance of a first, or most recent, open space calibration process.

As in FIG. 5, in FIGS. 7A and 7B, the wireless communication device 700 faces the user. The display 710 of the wireless communication device 700 and an anterior plane of the user's face may be parallel or substantially parallel. The user's gaze may be perpendicular or substantially perpendicular to these planes. This orientation is merely an example, and it should be understood that other orientations may be utilized by the processes or apparatus described herein. The wireless communication device is shown in the orientation of FIG. 7A and FIG. 7B for ease of illustration.

In FIG. 7A, the user's left hand is gripping the wireless communication device 700. A middle finger of the user's hand covers at least a portion of the antenna array module 708. The user's index finger is closely adjacent to the antenna array module 708. The user's left thumb is in proximity to the antenna array module 704. In this orientation, the user's thumb is within the open space volume associated with at least one antenna array module 704. As such, the position of the user's fingers and thumb may be sufficient to cause a cross-polarization perturbation of each of the signals received by the left antenna array module 704 and the right antenna array module 708 to be different from a cross-polarization perturbation previously obtained (e.g., obtained during an open space calibration process), or pre-stored by the factory in either the default open space value register 633 or the characterized open space calibration value register 634, both of FIG. 6. Alternatively, if the obtained open space value is obtained during proximity sensor operation, then the positioning of the user's fingers and thumb would also cause the measured open space value to be different from the open space calibration value stored in open space calibration value register 631, default open space value register 633, and characterized open space calibration value register 634. The difference may cause the wireless communication device to determine that there is an error in a new open space calibration process or an object (e.g., a human object) is in proximity to or covering the antenna array module 630 in the open space. The wireless communication device 700 may determine that the values associated with cross-polarization measurements are different from expected values and consequently determine what action to take in response to determining the difference.

In one example, the wireless communication device 700 may determine that the difference may be a result of a human object (e.g., a user's finger) near or on one or more of the antenna array modules 704, 708 and that a higher radiated output power from the antenna array modules 704, 708 may be needed to achieve a promised signal reliability, for example. However, the wireless communication device 700 may be unable to increase the output power while the human object is on or near the antenna array modules 704, 708 because the increased power level would exceed the MPE. In this circumstance, the wireless communication device 700 may alert/warn/request the user to reposition the user's hand (e.g., thumb and fingers) away from the antenna array modules 704, 708 before the wireless communication device can safely increase the transmit power. However, the difference in cross-polarization perturbations (as between the previously measured and stored value in the memory of the wireless communication device 700 and the just measured value) may be due to an addition of or a change of a protective cover 712 on the wireless communication device 700. According to this aspect, the wireless communication device 700 may request a user to implement (e.g., perform) a new open space calibration.

According to one exemplary implementation of the new open space calibration, the wireless communication device 700 may cause the display of a message 714 on a display 710 of the wireless communication device 700. In the illustrated example of FIGS. 7A and 7B, the message 714 reads: "Hold phone below the above line using one hand, and away from nearby objects." FIG. 7B illustrates a compliant handgrip, where the thumb on the front of the wireless communication device and the fingers on the rear of the wireless communication device 700 are below the thick line displayed on the display 710. Once compliance with the message 714 is verified, the wireless communication device may execute (e.g., run) the open space calibration process, and the open space calibration data may be collected. FIG. 7B graphically depicts open space 720 to the left, above, and right of the wireless communication device 700.

FIG. 8 is a flow diagram illustrating an open space calibration process (e.g., a method) according to some aspects described herein. The process may be a process of open space calibration of an antenna array module of a wireless communication device in a wireless communication network. The wireless communication device may be, for example, any of the wireless communication devices or scheduled entities of FIGS. 1-7. As described below, some or all illustrated features may be omitted in a particular implementation within the scope of the present disclosure, and some illustrated features may only be used for implementation of some aspects. In some examples, the method may be performed by the wireless communication device 600, as described above and illustrated in FIG. 6, by a processor or processing system, or by any suitable means for carrying out the described functions.

At block 802, the wireless communication device may display, on a display of the wireless communication device, an open space calibration instruction prompting a user to hold the wireless communication device during the open space calibration. According to some aspects, displaying, on the display of the wireless communication device, the open space calibration instruction may further include displaying an instruction to hold the wireless communication device without covering the antenna array module and ensure that no object is within a given distance of the wireless communication device in each of a plurality of directions from the wireless communication device. In one example, the given distance may be between about 30 cm and 60 cm. In another example, the given distance may be between about 30 cm and 40 cm. According to some aspects, displaying, on the display of the wireless communication device, the open space calibration instruction may further include providing a visualization of a location in which a user is to grasp the wireless communication device on the display of the wireless communication device. For example, the user interaction circuitry 645 and the user interface 616, shown and described above in connection with FIG. 6, may provide a means to display the open space calibration instruction on a display of the wireless communication device.

At block 804, the wireless communication device may transmit a proximity test signal from the antenna array module. According to some aspects, transmitting the proximity test signal from the antenna array module, and measuring the value of the first signal received at the antenna array module in response to transmitting the proximity test signal, may also include transmitting the proximity test signal from at least one antenna of the antenna array module, and measuring the value of the first signal at two other antennas of the antenna array module that are cross-polarized with respect to one another. For example, the open space calibration circuitry 642, the transceiver 628, and the antenna array module 630, shown and described above in connection with FIG. 6, may provide a means to transmit the proximity test signal from the antenna array module.

At block 806, the wireless communication device may measure a value of a first signal received at the antenna array module in response to transmitting the proximity test signal. According to one aspect, measuring the value of the first signal received at the antenna array module may include measuring a received version of the proximity test signal at two respective polarizations. According to another aspect, measuring the value of the first signal received at the antenna array module may include measuring a received version of the proximity test signal as a cross-polarization perturbation of the received version of the proximity test signal at two respective polarizations. For example, the open space calibration circuitry 642, shown and described above in connection with FIG. 6, may provide a means to measure the value of the first signal received at the antenna array module in response to transmitting the proximity test signal. By way of another example, where the wireless communication device configures antenna array module 630 as a proximity sensor, the proximity circuitry 643, shown and described above in connection with FIG. 6, may provide a means to measure the value of the first signal received at the antenna array module in response to transmitting the proximity test signal. In both examples, the transceiver 628 and antenna array module 630 shown and described above in connection with FIG. 6 may provide a means to transmit and receive the proximity test signal and first signal, respectively.

At block 808, the wireless communication device may store the value of the first signal as an open space calibration value of the antenna array module. For example, the open space calibration value register 631 of memory 610 of the processing system 602, as well as the antenna array module 630, shown and described above in connection with FIG. 6, may provide a means to store the value of the first signal as an open space calibration value of the antenna array module.

Subsequent to storage at block 808, the wireless communication device may at least one of: initiate the open space calibration of the antenna array module during a bootup of the wireless communication device, initiate the open space calibration of the antenna array module in response to detecting a coupling of a protective cover to the wireless communication device, initiate the open space calibration of the antenna array module in response to determining that a difference between a characterized open space calibration value stored in a memory of the wireless communication device and a prior open space calibration value is greater than a predetermined threshold, or initiate the open space calibration of the antenna array module in response to receiving a command to calibrate the antenna array module.

According to some aspects, the open space calibration process 800 may further include configuring, by the wireless communication device, the antenna array module as an antenna array module proximity sensor, transmitting the proximity test signal from the antenna array module, measuring a second value of a second signal received at the antenna array module in response to transmitting the proximity test signal, and determining that an object is covering at least a portion of the antenna array module or within a predefined distance from the antenna array module when the second value of the second signal is different from the value of the first signal.

According to other aspects, the open space calibration process 800 may further include comparing the open space calibration value of the antenna array module to a characterized open space calibration value stored in a memory of the wireless communication device, and verifying that the antenna array module is uncovered during the measuring of the value of the first signal when a difference between variances of the open space calibration value and the characterized open space calibration value is less than a predetermined amount.

In some examples, the open space calibration process 800 may further include measuring a magnitude of motion of the wireless communication device and verifying that the user complies with the open space calibration instruction when the magnitude of the motion of the wireless communication device is greater than a predetermined threshold. In other examples, the open space calibration process 800 may further include transmitting the proximity test signal from the antenna array module while displaying, on the display of the wireless communication device, the open space calibration instruction.

FIG. 9 is a flow diagram illustrating an open space calibration process 900 (e.g., a method) of open space calibration of an antenna array module of a wireless communication device in a wireless communication network according to some aspects described herein. The wireless communication device may be, for example, any of the wireless communication devices or scheduled entities of FIGS. 1-8. As described below, some or all illustrated features may be omitted in a particular implementation within the scope of the present disclosure, and some illustrated features may only be used for implementation of some aspects. In some examples, the method may be performed by the wireless communication device 600, as described above and illustrated in FIG. 6, by a processor or processing system, or by any suitable means for carrying out the described functions.

At block 902, a wireless communication device may determine if initiation of an open space calibration of the wireless communication device may be performed (e.g., if initiation of open space calibration of the antenna array modules configured as proximity detectors may be to be performed). For example, the wireless communication device may determine to initiate performance of an open space calibration based on at least one of: a bootup of the wireless communication device may be performed, attachment of a protective cover to the wireless communication device may be detected, an existing open space calibration may be inaccurate, or a command may be received to calibrate the antenna array modules of the wireless communication device. For example, the open space calibration circuitry 642, shown and described above in connection with FIG. 6, may provide a means to determine if initiation of the open space calibration of the wireless communication device may be performed.

In some examples, the wireless communication device may determine to initiate performance of open space calibration by transmitting a proximity test signal from the antenna array module when the antenna array module may be configured as an antenna array module proximity sensor, measuring the value of a first signal received at the antenna array module in response to transmitting the proximity test signal, and determining that the value of the first signal may be different from a previously stored open space calibration value. Measuring the value of the first signal may further include determining a cross-polarization perturbation between a pair of cross-polarized antenna elements of the antenna array module receiving the first signal.

In another aspect, the wireless communication device may determine if an open space calibration trigger event has occurred. According to some aspects, one trigger event may be installing or detecting an installation of a first cover on the wireless communication device (e.g., installing a first protective cover after purchasing the wireless communication device). Another trigger event may be a cover replacement event. That is, installing or detecting an installation of a replacement cover on the wireless communication device (e.g., reinstallation or replacement of a protective cover). Another trigger event may be receiving an open space calibration command at a processor of the wireless communication device. The open space calibration command may be input to the wireless communication device (e.g., by a user). If at block 902, the wireless communication device determines that no trigger event has occurred, the wireless communication device may return to block 902. In other words, the wireless communication device may cycle through (e.g., in and out of) block 902 until a trigger event occurs. If at block 902, a trigger event does occur, then the wireless communication device may continue to block 904.

At block 904, the wireless communication device may display an open space calibration instruction on a display of the wireless communication device. Displaying the open space calibration instruction on the display of the wireless communication device may include displaying an instruction to physically hold the wireless communication device in a way that does not cover any antenna array module of the wireless communication device. For example, the instruction may direct a user to hold the wireless communication device in a way that ensures that no object (e.g., a human object, a finger, a thumb, etc.) partially or entirely covers an antenna array module of the wireless communication device. In some examples, the instruction may ensure that no object may be within a given distance of the wireless communication device in each of a plurality of directions from the wireless communication device. The plurality of directions may include the directions relative to a left side, right side, top, front, and/or rear of the wireless communication device. The given distance may correspond to the open space distance. The given distance may be about 30-60 cm, or more particularly may be about 30-40 cm. For example, the user interaction circuitry 645 and the user interface 616, shown and described above in connection with FIG. 6, may provide a means to display the open space calibration instruction on a display of the wireless communication device.

The open space calibration instruction may include, for example, the message 714 of FIG. 7, namely "Hold phone below the above line using one hand, and away from nearby objects." According to another aspect, an exemplary message may read: "Hold phone below the above line using one hand, away from nearby objects and at arms-length from the face." According to one aspect, only one message may be offered. Particular movements or reorientation-in-space of the wireless communication device during the open space calibration process 900 may be unnecessary. A user may move the wireless communication device in open space as long as the user complies with open space distance parameters (e.g., maintains the wireless communication device about 30-60 cm, or more particularly about 30-40 cm, away from objects, including, for example, the user's head and body). Motion-sensing circuitry 644, in conjunction with motion sensors 626, may measure movement and indicate movement to open space calibration circuitry 642 of FIG. 6, for example.

Holding the wireless communication device such that no object may be within a given distance from a left side, right side, top, front, and/or rear of the wireless communication device may be a way of establishing a functional open space needed for an open space calibration. The functional open space may approximate a true open space. A true open space may be an inherently static environment. In this context, the word "true" may mean "actual" or "an actual manifestation of." True does not necessarily mean ideal or absolute.

In some examples, nothing moves in the inherently static environment of the true open space that would perturb the proximity test signal. Without movement, nothing perturbs reception, at cross-polarized receive antennas, of the transmitted proximity test signal. Any perceived perturbation in a true open space may be attributed to noise in the receiver of the proximity sensor. The detection of a perturbation, different from that measured during open space calibration, may indicate the presence of an object, such as a human object, close to the antenna array module proximity sensor (configured from the antennas of the antenna array module). In some examples, the wireless communication device may use a motion sensor algorithm (e.g., stored in motion sensor algorithm register 635 of FIG. 6) to quantify and/or detect perturbations of the transmitted/received proximity test signal.

At block 906, the wireless communication device may wait to verify that the wireless communication device is ready and oriented in space for open space calibration. According to one example, the wireless communication device may verify that the user may be holding the wireless communication device as requested for the open space calibration by receiving an indication from the user. For example, the user may perform a quick rotation of the wireless communication device, shake the wireless communication device, hold an open palm in front of the user's face, or any other way that the user can communicate the readiness of the wireless communication device, in space, for the open space calibration process. The wireless communication device may use the statistical operations described above to detect the micro-motion before or during, for example, an open space calibration process. Detection of micro-motion may be one indicator by which the wireless communication device determines whether the user may be complying with open space calibration instructions. By way of example, a wireless communication device may exhibit micro-motion when held tightly in a user's hand. The user's pulse may transfer to the wireless communication device, causing the wireless communication device's micro-motion. For example, the open space calibration circuitry 642 and the motion sensors 626, shown and described above in connection with FIG. 6, may provide a means to wait to verify that the wireless communication device is ready and oriented in space for open space calibration.

If at block 906, the wireless communication device determines that it may be oriented for open space calibration, the wireless communication device may return to the top of block 906. In other words, the wireless communication device may cycle through (e.g., in and out of) block 906 until it receives or derives a signal verifying that the wireless communication device is positioned (e.g., oriented) in space according to the displayed message. For example, the open space calibration circuitry 642 and the motion sensors 626, shown and described above in connection with FIG. 6, may provide a means for the wireless communication device to determine that it may be oriented for open space calibration.

At block 908, the wireless communication device may execute the open space calibration and collect the open space calibration data. According to one aspect, the wireless communication device may transmit a proximity test signal from the antenna array module into an open space devoid of objects. According to some aspects, the wireless communication device may transmit the proximity test signal from the antenna array module while displaying the open space calibration instruction. Transmitting the proximity test signal from the antenna array module and measuring the value of the first signal received at the antenna array module may further include transmitting the proximity test signal from at least one antenna of the antenna array module and receiving the first signal at two other antennas of the antenna array module that are cross-polarized with respect to one another. The received proximity test signal may be unperturbed (e.g., if received while no object is present in the open space). If the open space devoid of objects is, in fact, not devoid of objects, the received proximity test signal may be perturbed by whatever object(s) is in the region defined for the open space. For example, the open space calibration circuitry 642, the memory 610, and various registers, including the open space calibration value register 631, shown and described above in connection with FIG. 6, may provide a means for the wireless communication device to execute the open space calibration and collect the open space calibration data.

The wireless communication device may measure a value of the first signal received at the antenna array module during transmission of the proximity test signal. Measuring the value of the first signal may include measuring a received version of the proximity test signal at two respective polarizations. According to another aspect, measuring the value of the first signal may include measuring a received version of the proximity test signal as a value of a cross-polarization perturbation of a received version of the proximity test signal at two respective polarizations. According to some aspects, open space calibration data may include cross-channel perturbation data for each wireless communication device antenna array module. According to one aspect, each cross-channel perturbation may be a scalar value. According to other aspects, each cross-channel perturbation may be a vector value. According to still another aspect, each cross-channel perturbation may be expressed as an array of values.

The proximity test signals may be transmitted simultaneously or sequentially. The receivers associated with the cross-polarized receive antennas at a respective antenna array module may receive a version of the proximity test signal leaked and/or reflected back into the respective cross-polarized receive antennas. The cross-polarized perturbation of the electromagnetic field at the receive antennas may then be measured and stored as either an open space calibration value (if the proximity test signal was transmitted during open space calibration of the antenna assembly module) or as a proximity test result (if the proximity test signal was transmitted during proximity test of the antenna assembly module).

According to some aspects, the wireless communication device may additionally verify that the antenna array module may be covered by a human object during the measurement of the value of the first signal. In some aspects, verifying that the antenna array module may be covered by a human object during the measurement of the value of the first signal may include comparing the open space calibration values of the antenna array module to characterized open space calibration values stored in a memory of the wireless communication device (e.g., a factory derived open space calibration values). In other aspects, verifying that the antenna array module may be covered by the human object during the measuring of the value of the first signal may further include determining if data collected from at least one of a gyroscope or an accelerometer indicate a lack of motion of the wireless communication device during open space calibration process. The lack of any motion may indicate that the user placed the wireless communication device on a table, for example, during the open space calibration process. Placing the wireless communication device on a table would result in an object (the table) being within the open space (e.g., the table would be within millimeters of the wireless communication device antenna array modules, rather than within about 30-60 cm or more particularly within about 30-40 cm). The wireless communication device may move through space during open space calibration so long as the open space calibration distance parameters are not violated (e.g., so long as about 30-60 cm or more particularly about 30-40 cm may be maintained between the wireless communication device and an object, including a user's head and body). An absence of any movement detected by the gyroscopes or accelerometers following a period in which movement was detected may indicate a change to the way a user may be holding the wireless communication device and may indicate that the wireless communication device may no longer be held in an open space.

At block 909, the wireless communication device may use a motion sensor algorithm (also referred to as a motion detection algorithm) to confirm compliance by the user with the instructions given at block 904. The motion sensor algorithm may consider perturbation values associated with one or more antenna assembly modules, during the open space calibration process, for example. Changes to perturbation values during the open space calibration (e.g., rapid fluctuation) may indicate that the user was, for example, waving his or her hands or fingers around an area of one or more antenna array modules. Such behavior would not be consistent with the instructions and may tend to indicate that the user was not compliant with the open space calibration instructions. According to some aspects, the motion sensor algorithm may additionally utilize motion sensor data (e.g., from motion sensors 626 of FIG. 6) to determine, for example, if the wireless communication device was motionless during an open space calibration process. A lack of motion may be indicative of the wireless communication device being placed on a table for the duration of the open space calibration process. Placing the wireless communication device on a table during open space calibration process would indicate non-compliance with open space calibration instructions, which may call for the user to hold the wireless communication device about 60-60 cm from any objects, or more particularly about 30-40 cm from any object. For example, the open space calibration circuitry 642, the motion sensors 626, and the memory 610 that stores the motion sensor algorithm register 635, shown and described above in connection with FIG. 6, may provide a means for the wireless communication device to use a motion sensor algorithm (also referred to as a motion detection algorithm) to confirm compliance by the user with the instructions given at block 904.

At block 910, the wireless communication device may optionally use characterized open space calibration values stored, for example, in a characterized open space calibration value register, similar to characterized open space calibration value register 634 of memory 610 of the wireless communication device 600 of FIG. 6. The characterized open space calibration values may be pre-stored on the wireless communication device or otherwise obtained. The factory may provide the characterized open space calibration values. The characterized open space calibration values may be derived by collecting and averaging a plurality of open space calibration values from tens, hundreds, or more wireless communication devices of the same model. The sample size (e.g., tens, hundreds, or more) is exemplary and non-limiting. The characterized open space calibration values may be compared with a user-measured open space calibration value to quantify how the two values correspond. Open space calibration values (regardless of whether they are measured by the user or provided by the factory characterized open space calibration values) may appear as a grouping of points on an I/Q coordinate system (e.g., a cross-polarized coordinate system). The center of the grouping may be determined based on the average of the locations of the points of all samples on the I/Q coordinate grid. The diameter of the grouping may have a given standard deviation or variance. The various groupings (e.g., based on user measured open space calibration value or factory-provided characterized open space calibration values) may have centers at various locations in the I/Q coordinate grid, but the groupings may all have approximately the same diameter (e.g., the same standard deviation or variance). If the user-measured open space calibration values and the characterized open space calibration values (measured in open space by the factory) are substantially similar in diameter (without regard to the location of the centers of the groupings in the I/Q grid), then a user-measured open space calibration value may be accurate. For example, the open space calibration circuitry 642 and the memory 610 storing the characterized open space calibration values in the characterized open space calibration value register 634, shown and described above in connection with FIG. 6, may provide a means for the wireless communication device to use characterization data stored, for example, in the characterized open space calibration value register 634.

However, the groupings may have substantially the same diameter if the user improperly performed the open space calibration process by not complying with an instruction to hold the wireless communication device about 30-60 cm or more particularly about 30-40 cm, away from objects, including human objects. The wireless communication device may use motion sensors to determine if the user is compliant with the open space calibration instructions. If, for example, the groupings have about the same diameter (e.g., about the same standard deviation or variance) but the motion sensors determined that the wireless communication device was substantially still (e.g., because it is laying on a table), then the open space calibration circuitry 642 implementing the motion sensor algorithm stored at the motion sensor algorithm register 635 may conclude that the user may not be compliant with the open space calibration instructions. The result may be that the wireless communication device may display a prompt on a display of the wireless communication device, indicating that the user should repeat the open space calibration process.

An open space calibration process may also be unsuccessful if the user-measured open space calibration values are not in any grouping but are scattered throughout one or more quadrants of the I/Q grid. This result may occur when an object is within the open space during the open space calibration process. The scattering may be due to the perturbation of the received proximity test signals at the antenna array module's cross-polarized antennas. The perturbations may be due to the object in the open space. Similar to the non-compliant test result, the wireless communication device may again display a prompt on the display of the wireless communication device, indicating that the user should repeat the open space calibration process.

At block 910, the wireless communication device may additionally or alternatively collect data from external sensing devices of the wireless communication device, including, for example, gyroscopes, accelerometers, touch sensors under a wireless communication device's screen, front and/or back cameras, and or infrared sensors (e.g., for specific absorption rate (SAR)) to detect compliance with the instructions. Non-compliance with the instructions may result in the user being asked to reperform the open space calibration. For example, the open space calibration circuitry 642, the physical parameter sensors 624, and the memory 610 storing the characterized open space calibration value register 634, shown and described above in connection with FIG. 6, may provide a means for the wireless communication device to additionally or alternatively collect data from external sensing devices of the wireless communication device.

At block 912, the wireless communication device may consider whether the measured open space calibration values, proximity data, and/or wireless communication device motion data is consistent with the characterized open space calibration values, expected proximity data, and/or expected wireless communication device motion data. If at block 912, the wireless communication device determines that the measured and expected results are consistent, then the wireless communication device may, at block 914, store the value of the first signal as the open space calibration value of the antenna array module. The wireless communication device may use the stored data in further processing. The wireless communication device may end the process following block 914. However, if, at block 912, the wireless communication device determines that the measured and expected results are not consistent, then the wireless communication device may proceed to block 916. For example, the open space calibration circuitry 642, the motion-sensing circuitry 644, and the memory 610 with its various registers 631-635, shown and described above in connection with FIG. 6, may provide a means for the wireless communication device to consider whether the measured open space calibration data, proximity data, and/or wireless communication device motion data is consistent with the characterized open space calibration values, expected proximity data, and/or expected wireless communication device motion data.

At block 916, the wireless communication device may determine if a predefined number of open space calibration attempts were made. The predefined number, N, may be set according to preference or experience. If at block 916, the number, N, of open space calibration attempts is less than N, the wireless communication device may return to block 904 and reattempt the open space calibration process. However, if at block 916, the number of open space calibration attempts is equal to N, then at block 918, the wireless communication device may utilize the display to deliver a prompt to the user. The prompt may ask the user whether the user wants to use a previous open space calibration value (e.g., whether the user wants to retain the previous open space calibration value). The user may then respond to the prompt (e.g., by indicating yes or no) and thereby instruct the wireless communication device to use, or not use, the previous open space calibration value. The wireless communication device may determine whether the instruction to use the previously stored open space calibration value may be received based on an input from a user in response to a prompt on the display of the wireless communication device. For example, the communication and processing circuitry 641, shown and described above in connection with FIG. 6, may provide a means for the wireless communication device to determine if the predefined number of open space calibration attempts were made.

If the wireless communication device receives a response (an input) indicative of a user's decision not to use the previous open space calibration (e.g., not to use an open space calibration value stored in the open space calibration value register 631, or a default open space value stored in the default open space value register 633, or characterized open space calibration values stored in the characterized open space calibration value register 634, or a measured open space value stored in the measured open space value register 632), then at block 920 the wireless communication device may set a proximity detection flag equal to "true." The proximity detection flag value may be stored in the flag value register 636 of FIG. 6, for example. When the proximity detection flag may be set equal to true, the wireless communication device may persistently report proximity detection. In response to the report of proximity detection, the wireless communication device controls transmissions to maintain transmitted power levels within the MPE regulations. This power level limitation may mean that the wireless communication device may be unable to increase transmitted power (which may affect the quality of service provided by the wireless communication device). The proximity detection flag value may be stored in the flag value register 636 or another location of the memory 610 of FIG. 6, for example. Setting the proximity detection flag equal to true may configure the proximity sensor to report a proximity detection until a successful open space calibration is completed.

However, if the wireless communication device receives a response indicative of a user's decision to use the previous open space calibration (e.g., an indication that the previously stored open space calibration values should remain intact and unchanged), then the wireless communication device may end the process.

In one aspect, a wireless communication device for wireless communication in a wireless communication network may include means for displaying, on a display of the wireless communication device, an open space calibration instruction prompting a user to hold the wireless communication device during the open space calibration, means for transmitting a proximity test signal from the antenna array module, means for measuring a value of a first signal received at the antenna array module in response to transmitting the proximity test signal, and means for storing the value of the first signal as an open space calibration value of the antenna array module. The aforementioned means may be the processor 604 shown FIG. 6, configured to perform the functions recited by the aforementioned means. Additionally or alternatively, in any of the aspects described above, the aforementioned means may be a circuit or any apparatus configured to perform the functions recited by the aforementioned means.

Of course, in the above examples, the circuitry included in the processor 604 is merely provided as an example. Other means for carrying out the described functions may be included within various aspects of the present disclosure, including but not limited to the instructions stored in the computer-readable medium 612 of FIG. 6 or any other suitable apparatus or means described in any one of the FIGS. 1-7, for example, the methods, processes, and/or algorithms described herein in relation to FIGS. 8-9.

The following provides an overview of the present disclosure:

Aspect 1: A method of open space calibration of an antenna array module of a wireless communication device in a wireless communication network, the method comprising: displaying, on a display of the wireless communication device, an open space calibration instruction prompting a user to hold the wireless communication device during the open space calibration; transmitting a proximity test signal from the antenna array module; measuring a value of a first signal received at the antenna array module in response to transmitting the proximity test signal; and storing the value of the first signal as an open space calibration value of the antenna array module.

Aspect 2: The method of aspect 1, wherein the measuring the value of the first signal received at the antenna array module comprises: measuring a received version of the proximity test signal at two respective polarizations.

Aspect 3: The method of aspect 1 or 2, wherein the measuring the value of the first signal received at the antenna array module comprises: measuring a received version of the proximity test signal as a cross-polarization perturbation of the received version of the proximity test signal at two respective polarizations.

Aspect 4: The method of any of aspects 1 through 3, further comprising at least one of: initiating the open space calibration of the antenna array module during a bootup of the wireless communication device; initiating the open space calibration of the antenna array module in response to detecting a coupling of a protective cover to the wireless communication device; initiating the open space calibration of the antenna array module in response to determining that a difference between a characterized open space calibration value stored in a memory of the wireless communication device and a prior open space calibration value is greater than a predetermined threshold; or initiating the open space calibration of the antenna array module in response to receiving a command to calibrate the antenna array module.

Aspect 5: The method of any of aspects 1 through 4, wherein displaying, on the display of the wireless communication device, the open space calibration instruction further comprises: displaying an instruction to hold the wireless communication device without covering the antenna array module and ensure that no object is within a given distance of the wireless communication device in each of a plurality of directions from the wireless communication device.

Aspect 6: The method of aspect 5, wherein the given distance is between 30 cm and 60 cm.

Aspect 7: The method of aspect 5, wherein the given distance is between 30 cm and 40 cm.

Aspect 8: The method of any of aspects 1 through 7, wherein displaying, on the display of the wireless communication device, the open space calibration instruction further comprises: providing a visualization of a location in which the user is to grasp the wireless communication device on the display of the wireless communication device.

Aspect 9: The method of any of aspects 1 through 8, wherein the transmitting the proximity test signal from the antenna array module, and measuring the value of the first signal received at the antenna array module in response to transmitting the proximity test signal further comprises: transmitting the proximity test signal from at least one antenna of the antenna array module; and measuring the value of the first signal at two other antennas of the antenna array module that are cross-polarized with respect to one another.

Aspect 10: The method of any of aspects 1 through 9, further comprising: configuring, by the wireless communication device, the antenna array module as an antenna array module proximity sensor; transmitting the proximity test signal from the antenna array module; measuring a second value of a second signal received at the antenna array module in response to transmitting the proximity test signal; and determining that an object is covering at least a portion of the antenna array module or within a predefined distance from the antenna array module when the second value of the second signal is different from the value of the first signal.

Aspect 11: The method of any of aspects 1 through 10, further comprising: comparing the open space calibration value of the antenna array module to a characterized open space calibration value stored in a memory of the wireless communication device; and verifying that the antenna array module is uncovered during the measuring of the value of the first signal when a difference between variances of the open space calibration value and the characterized open space calibration value is less than a predetermined amount.

Aspect 12: The method of any of aspects 1 through 11, further comprising: measuring a magnitude of motion of the wireless communication device; and verifying that the user complies with the open space calibration instruction when the magnitude of the motion of the wireless communication device is greater than a predetermined threshold.

Aspect 13: The method of any of aspects 1 through 12, further comprising: transmitting the proximity test signal from the antenna array module while displaying, on the display of the wireless communication device, the open space calibration instruction.

Aspect 14: A wireless communication device for wireless communication in a wireless communication network, comprising: an antenna array module; a wireless transceiver communicatively coupled to the antenna array module; a memory; and a processor communicatively coupled to the antenna array module, the wireless transceiver, and the memory, wherein the processor is configured to: display, on a display of the wireless communication device, an open space calibration instruction prompting a user to hold the wireless communication device during the open space calibration; transmit a proximity test signal from the antenna array module; measure a value of a first signal received at the antenna array module in response to transmitting the proximity test signal; and store the value of the first signal as an open space calibration value of the antenna array module.

Aspect 15: The wireless communication device for wireless communication in the wireless communication network of aspect 14, wherein the processor is configured to measure the value of the first signal received at the antenna array module by further configuring the processor to: measure a received version of the proximity test signal at two respective polarizations.

Aspect 16: The wireless communication device for wireless communication in the wireless communication network of aspect 14 or 15, wherein the processor is configured to measure the value of the first signal received at the antenna array module by further configuring the processor to: measure a received version of the proximity test signal as a cross-polarization perturbation of the received version of the proximity test signal at two respective polarizations.

Aspect 17: The wireless communication device for wireless communication in a wireless communication network of any of aspects 14 through 16, wherein the processor is further configured to at least one of: initiate the open space calibration of the antenna array module during a bootup of the wireless communication device; initiate the open space calibration of the antenna array module in response to detecting a coupling of a protective cover to the wireless communication device; initiate the open space calibration of the antenna array module in response to determining that a difference between a characterized open space calibration value stored in a memory of the wireless communication device and a prior open space calibration value is greater than a predetermined threshold; or initiate the open space calibration of the antenna array module in response to receiving a command to calibrate the antenna array module.

Aspect 18: The wireless communication device for wireless communication in the wireless communication network of any of aspects 14 through 17, wherein the processor is configured to display, on the display of the wireless communication device, the open space calibration instruction by further configuring the processor to: display an instruction to hold the wireless communication device without covering the antenna array module and ensure that no object is within a given distance of the wireless communication device in each of a plurality of directions from the wireless communication device.

Aspect 19: The wireless communication device for wireless communication in a wireless communication network of aspect 18, wherein the given distance is between 30 cm and 60 cm.

Aspect 20: The wireless communication device for wireless communication in a wireless communication network of aspect 18, wherein the given distance is between 30 cm and 40 cm.

Aspect 21: The wireless communication device for wireless communication in the wireless communication network of any of aspects 14 through 20, wherein the processor is configured to display, on the display of the wireless communication device, the open space calibration instruction by further configuring the processor to: provide a visualization of a location in which the user is to grasp the wireless communication device on the display of the wireless communication device.

Aspect 22: The wireless communication device for wireless communication in the wireless communication network of any of aspects 14 through 21, wherein the processor is configured transmit the proximity test signal from the antenna array module, and measure the value of the first signal received at the antenna array module in response to transmitting the proximity test signal by further configuring the processor to: transmit the proximity test signal from at least one antenna of the antenna array module; and measure the value of the first signal at two other antennas of the antenna array module that are cross-polarized with respect to one another.

Aspect 23: The wireless communication device for wireless communication in the wireless communication network of any of aspects 14 through 22, wherein the processor is further configured to: configure the antenna array module as an antenna array module proximity sensor; transmit the proximity test signal from the antenna array module; measure a second value of a second signal received at the antenna array module in response to transmitting the proximity test signal; and determine that an object is covering at least a portion of the antenna array module or within a predefined distance from the antenna array module when the second value of the second signal is different from the value of the first signal.

Aspect 24: The wireless communication device for wireless communication in the wireless communication network of any of aspects 14 through 23, wherein the processor is further configured to: compare the open space calibration value of the antenna array module to a characterized open space calibration value stored in the memory of the wireless communication device; and verify that the antenna array module is uncovered during the measuring of the value of the first signal when a difference between variances of the open space calibration value and the characterized open space calibration value is less than a predetermined amount.

Aspect 25: The wireless communication device for wireless communication in the wireless communication network of any of aspects 14 through 24, wherein the processor is further configured to: measure a magnitude of motion of the wireless communication device; and verify that the user complies with the open space calibration instruction when the magnitude of the motion of the wireless communication device is greater than a predetermined threshold.

Aspect 26: The wireless communication device for wireless communication in the wireless communication network of any of aspects 14 through 25, wherein the processor is further configured to: transmit the proximity test signal from the antenna array module while displaying, on the display of the wireless communication device, the open space calibration instruction.

Aspect 27: A wireless communication device for wireless communication in a wireless communication network comprising at least one means for performing a method of any one of aspects 1 through 13.

Aspect 28: A non-transitory computer-readable medium storing computer-executable code, comprising code for causing an apparatus to perform a method of any one of aspects 1 through 13.

Several aspects of a wireless communication network are presented with reference to an exemplary implementation. As those skilled in the art will readily appreciate, various aspects described throughout this disclosure may be extended to other telecommunication systems, network architectures, and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA 2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-8 may be rearranged and/or combined into a single component, step, feature, or function or embodied in several components, steps, or functions. Additional elements, components, steps, and/or functions may also be added without departing from novel features disclosed herein. The apparatus, devices, and/or components illustrated in FIGS. 1-8 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. The construct "A and/or B" is intended to cover A or B or A and B. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of open space calibration of an antenna array module of a wireless communication device in a wireless communication network, the method comprising:
    displaying, on a display of the wireless communication device, an open space calibration instruction prompting a user to hold the wireless communication device in an open space, devoid of objects exclusive of a protective cover on the wireless communication device, during the open space calibration, the open space extending from a surface of the wireless communication device to a given distance from the surface of the wireless communication device;
    transmitting, from the antenna array module, a proximity test signal in connection with obtaining an open space calibration value of the antenna array module;
    measuring a value of a first signal received at the antenna array module in response to transmitting the proximity test signal into the open space devoid of objects exclusive of the protective cover; and
    storing the value of the first signal as the open space calibration value of the antenna array module.

2. The method of claim 1, wherein the measuring the value of the first signal received at the antenna array module comprises:
    measuring a received version of the proximity test signal at two respective polarizations.

3. The method of claim 1, wherein the measuring the value of the first signal received at the antenna array module comprises:
    measuring a received version of the proximity test signal as a cross-polarization perturbation of the received version of the proximity test signal at two respective polarizations.

4. The method of claim 1, further comprising at least one of:
    initiating the open space calibration of the antenna array module during a bootup of the wireless communication device;
    initiating the open space calibration of the antenna array module in response to detecting a coupling of the protective cover to the wireless communication device;
    initiating the open space calibration of the antenna array module in response to determining that a difference between a characterized open space calibration value stored in a memory of the wireless communication device and a prior open space calibration value is greater than a predetermined threshold; or
    initiating the open space calibration of the antenna array module in response to receiving a command to calibrate the antenna array module.

5. The method of claim 1, wherein displaying, on the display of the wireless communication device, the open space calibration instruction further comprises:
    displaying an instruction to hold the wireless communication device without covering the antenna array module and ensure that no object exclusive of the protective cover is within the given distance from the surface of the wireless communication device in each of a plurality of directions from the wireless communication device.

6. The method of claim 1, wherein the given distance is between 30 cm and 60 cm.

7. The method of claim 1, wherein the given distance is between 30 cm and 40 cm.

8. The method of claim 1, wherein displaying, on the display of the wireless communication device, the open space calibration instruction further comprises:
    providing a visualization of a location in which the user is to grasp the wireless communication device on the display of the wireless communication device.

9. The method of claim 1, wherein the transmitting the proximity test signal from the antenna array module, and measuring the value of the first signal received at the antenna array module in response to transmitting the proximity test signal into the open space devoid of objects exclusive of the protective cover further comprises:
    transmitting the proximity test signal into the open space devoid of objects exclusive of the protective cover from at least one antenna of the antenna array module; and
    measuring the value of the first signal at two other antennas of the antenna array module that are cross-polarized with respect to one another.

10. The method of claim 1, further comprising:
    configuring, by the wireless communication device, the antenna array module as an antenna array module proximity sensor;

transmitting the proximity test signal from the antenna array module;
measuring a second value of a second signal received at the antenna array module in response to transmitting the proximity test signal; and
determining that an object is covering at least a portion of the antenna array module or within a predefined distance from the antenna array module when the second value of the second signal is different from the value of the first signal.

11. The method of claim 1, further comprising:
comparing the open space calibration value of the antenna array module to a characterized open space calibration value stored in a memory of the wireless communication device; and
verifying that the antenna array module is uncovered during the measuring of the value of the first signal when a difference between variances of the open space calibration value and the characterized open space calibration value is less than a predetermined amount.

12. The method of claim 1, further comprising:
measuring a magnitude of a motion of the wireless communication device; and
verifying that the user complies with the open space calibration instruction when the magnitude of the motion of the wireless communication device is greater than a predetermined threshold.

13. The method of claim 1, further comprising:
transmitting the proximity test signal into the open space devoid of objects exclusive of the protective cover from the antenna array module while displaying, on the display of the wireless communication device, the open space calibration instruction.

14. A wireless communication device for wireless communication in a wireless communication network, comprising:
an antenna array module;
a wireless transceiver communicatively coupled to the antenna array module;
a memory; and
a processor communicatively coupled to the antenna array module, the wireless transceiver, and the memory, wherein the processor is configured to:
display, on a display of the wireless communication device, an open space calibration instruction prompting a user to hold the wireless communication device in an open space, devoid of objects exclusive of a protective cover on the wireless communication device, during the open space calibration, the open space extending from a surface of the wireless communication device to a given distance from the surface of the wireless communication device;
transmit, from the antenna array module, a proximity test signal in connection with obtaining an open space calibration value of the antenna array module;
measure a value of a first signal received at the antenna array module in response to transmitting the proximity test signal into the open space devoid of objects exclusive of the protective cover; and
store the value of the first signal as the open space calibration value of the antenna array module.

15. The wireless communication device for wireless communication in the wireless communication network of claim 14, wherein the processor is configured to measure the value of the first signal received at the antenna array module by further configuring the processor to:
measure a received version of the proximity test signal at two respective polarizations.

16. The wireless communication device for wireless communication in the wireless communication network of claim 14, wherein the processor is configured to measure the value of the first signal received at the antenna array module by further configuring the processor to:
measure a received version of the proximity test signal as a cross-polarization perturbation of the received version of the proximity test signal at two respective polarizations.

17. The wireless communication device for wireless communication in a wireless communication network of claim 14, wherein the processor is further configured to at least one of:
initiate the open space calibration of the antenna array module during a bootup of the wireless communication device;
initiate the open space calibration of the antenna array module in response to detecting a coupling of the protective cover to the wireless communication device;
initiate the open space calibration of the antenna array module in response to determining that a difference between a characterized open space calibration value stored in the memory of the wireless communication device and a prior open space calibration value is greater than a predetermined threshold; or
initiate the open space calibration of the antenna array module in response to receiving a command to calibrate the antenna array module.

18. The wireless communication device for wireless communication in the wireless communication network of claim 14, wherein the processor is configured to display, on the display of the wireless communication device, the open space calibration instruction by further configuring the processor to:
display an instruction to hold the wireless communication device without covering the antenna array module and ensure that no object exclusive of the protective cover is within the given distance from the surface of the wireless communication device in each of a plurality of directions from the wireless communication device.

19. The wireless communication device for wireless communication in a wireless communication network of claim 14, wherein the given distance is between 30 cm and 60 cm.

20. The wireless communication device for wireless communication in a wireless communication network of claim 14, wherein the given distance is between 30 cm and 40 cm.

21. The wireless communication device for wireless communication in the wireless communication network of claim 14, wherein the processor is configured to display, on the display of the wireless communication device, the open space calibration instruction by further configuring the processor to:
provide a visualization of a location in which the user is to grasp the wireless communication device on the display of the wireless communication device.

22. The wireless communication device for wireless communication in the wireless communication network of claim 14, wherein the processor is configured transmit the proximity test signal from the antenna array module, and measure the value of the first signal received at the antenna array module in response to transmitting the proximity test signal into the open space devoid of objects exclusive of the protective cover by further configuring the processor to:

transmit the proximity test signal into the open space devoid of objects exclusive of the protective cover from at least one antenna of the antenna array module; and measure the value of the first signal at two other antennas of the antenna array module that are cross-polarized with respect to one another.

23. The wireless communication device for wireless communication in the wireless communication network of claim 14, wherein the processor is further configured to:

configure the antenna array module as an antenna array module proximity sensor;

transmit the proximity test signal from the antenna array module;

measure a second value of a second signal received at the antenna array module in response to transmitting the proximity test signal; and determine that an object is covering at least a portion of the antenna array module or within a predefined distance from the antenna array module when the second value of the second signal is different from the value of the first signal.

24. The wireless communication device for wireless communication in the wireless communication network of claim 14, wherein the processor is further configured to:

compare the open space calibration value of the antenna array module to a characterized open space calibration value stored in the memory of the wireless communication device; and verify that the antenna array module is uncovered during the measuring of the value of the first signal when a difference between variances of the open space calibration value and the characterized open space calibration value is less than a predetermined amount.

25. The wireless communication device for wireless communication in the wireless communication network of claim 14, wherein the processor is further configured to:

measure a magnitude of a motion of the wireless communication device; and verify that the user complies with the open space calibration instruction when the magnitude of the motion of the wireless communication device is greater than a predetermined threshold.

26. The wireless communication device for wireless communication in the wireless communication network of claim 14, wherein the processor is further configured to:

transmit the proximity test signal into the open space devoid of objects exclusive of the protective cover from the antenna array module while displaying, on the display of the wireless communication device, the open space calibration instruction.

* * * * *